United States Patent
Sugiyama et al.

(10) Patent No.: US 7,502,414 B2
(45) Date of Patent: Mar. 10, 2009

(54) IMAGE PROCESSING DEVICE, IMAGE PROCESSING METHOD, IMAGE PROCESSING PROGRAM AND RECORDING MEDIUM

(75) Inventors: Akira Sugiyama, Kanagawa (JP); Haruo Togashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 862 days.

(21) Appl. No.: 10/472,813

(22) PCT Filed: Mar. 28, 2002

(86) PCT No.: PCT/JP02/03062

§ 371 (c)(1),
(2), (4) Date: Sep. 25, 2003

(87) PCT Pub. No.: WO02/080574

PCT Pub. Date: Oct. 10, 2002

(65) Prior Publication Data

US 2004/0114686 A1    Jun. 17, 2004

(30) Foreign Application Priority Data

Mar. 28, 2001    (JP) .............................. 2001-092848

(51) Int. Cl.
- H04N 7/12    (2006.01)
- H04N 11/02    (2006.01)
- H04N 11/04    (2006.01)
- H04B 1/66    (2006.01)

(52) U.S. Cl. ................................. 375/240.03
(58) Field of Classification Search ............ 375/240.01, 375/240.29
See application file for complete search history.

(56) References Cited

U.S. PATENT DOCUMENTS 5,051,840 A * 9/1991 Watanabe et al. ........... 382/239

(Continued)

FOREIGN PATENT DOCUMENTS

JP    2-262786    10/1990

(Continued)

*Primary Examiner*—Nhon Diep
(74) *Attorney, Agent, or Firm*—Frommer Lawrence & Haug LLP; William S. Frommer; Paul A. Levy

(57) ABSTRACT

Occurrence of mosquito noise of a macro block that contains even a small plain region is suppressed. One macro block is subdivided into sub blocks each of which is composed of four pixels×four lines. The average value of luminance levels of each sub block is calculated. The absolute values of the difference values between the luminance levels and the average value are obtained for each sub block. The minimum value of the average difference values of the 16 sub blocks of one macro block is selected and decided as an activity of the macro block. Corresponding to the decided activity, a quantizer scale of the macro block is decided. With the decided quantizer scale, the macro block is quantized. According to this method, since the size of each sub block is smaller than the size of a conventional sub block of eight pixels×eight lines, the average difference value of each sub block is more emphasized. Since the minimum value of the average difference values is designated as an activity of the macro block, an activity of a macro block that contains even a small plain portion can be more suppressed. As a result, a quantizer value of a macro block that contains an edge can be decreased. Thus, mosquito noise of a macro block that contains an edge portion of a picture can be suppressed.

2 Claims, 22 Drawing Sheets

U.S. PATENT DOCUMENTS

| | | | |
|---|---|---|---|
| 6,434,196 B1 * | 8/2002 | Sethuraman et al. | 375/240.12 |
| 6,496,607 B1 * | 12/2002 | Krishnamurthy et al. | 382/282 |
| 6,574,278 B1 * | 6/2003 | McVeigh et al. | 375/240.18 |
| 6,658,157 B1 * | 12/2003 | Satoh et al. | 382/239 |

FOREIGN PATENT DOCUMENTS

| | | |
|---|---|---|
| JP | 07-284102 | 10/1995 |
| JP | 7-284102 | 10/1995 |
| JP | 8-154229 | 6/1996 |

\* cited by examiner

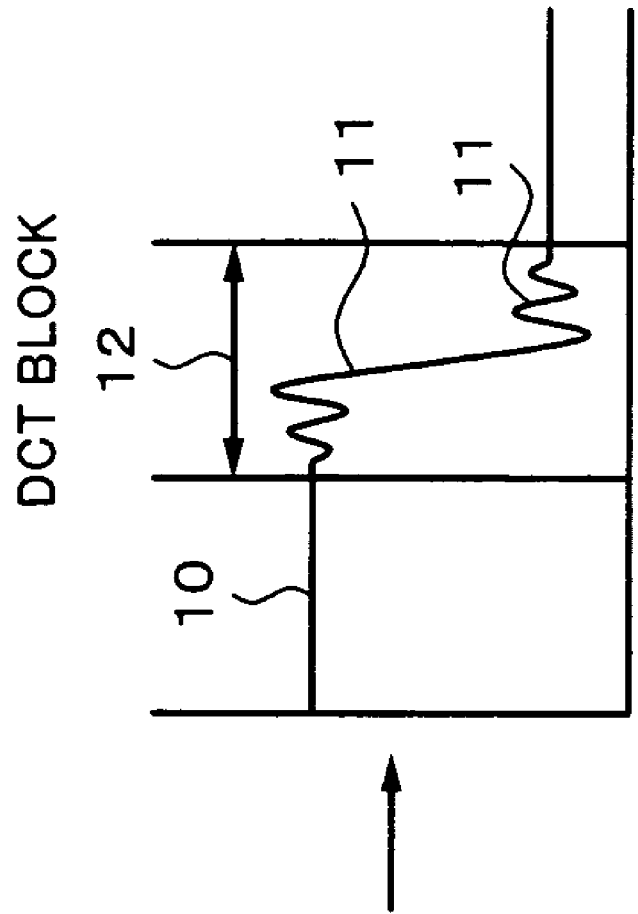
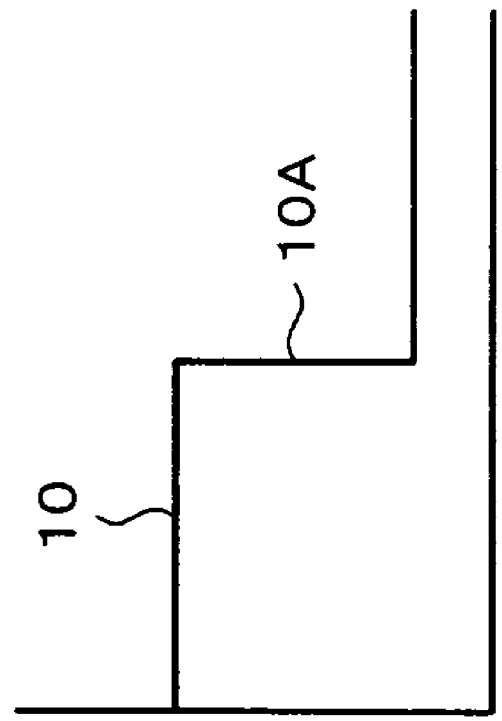

■ 16

□ 0

| P=2 var=3.5 | P=4 var=6.0 | P=4 var=6.0 | P=2 var=3.5 |
|---|---|---|---|
| P=1 var=1.9 | P=1 var=1.9 | P=4 var=6.0 | P=2 var=3.5 |
| P=1 var=1.9 | P=0 var=0.0 | P=1 var=1.9 | P=3 var=4.9 |
| P=2 var=3.5 | P=4 var=6.0 | P=4 var=6.0 | P=2 var=3.5 |

■ 16
□ 0

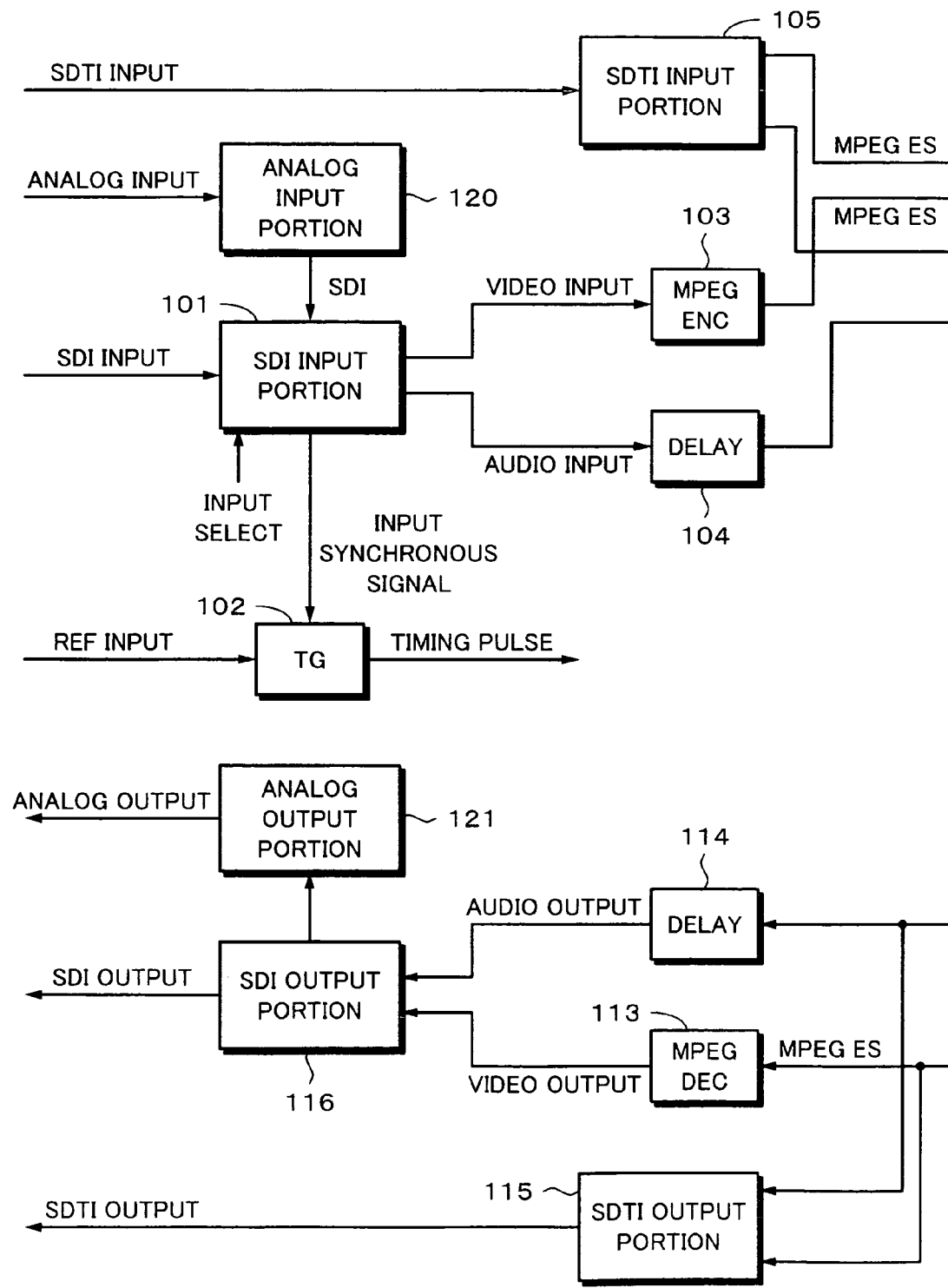

Fig. 8A
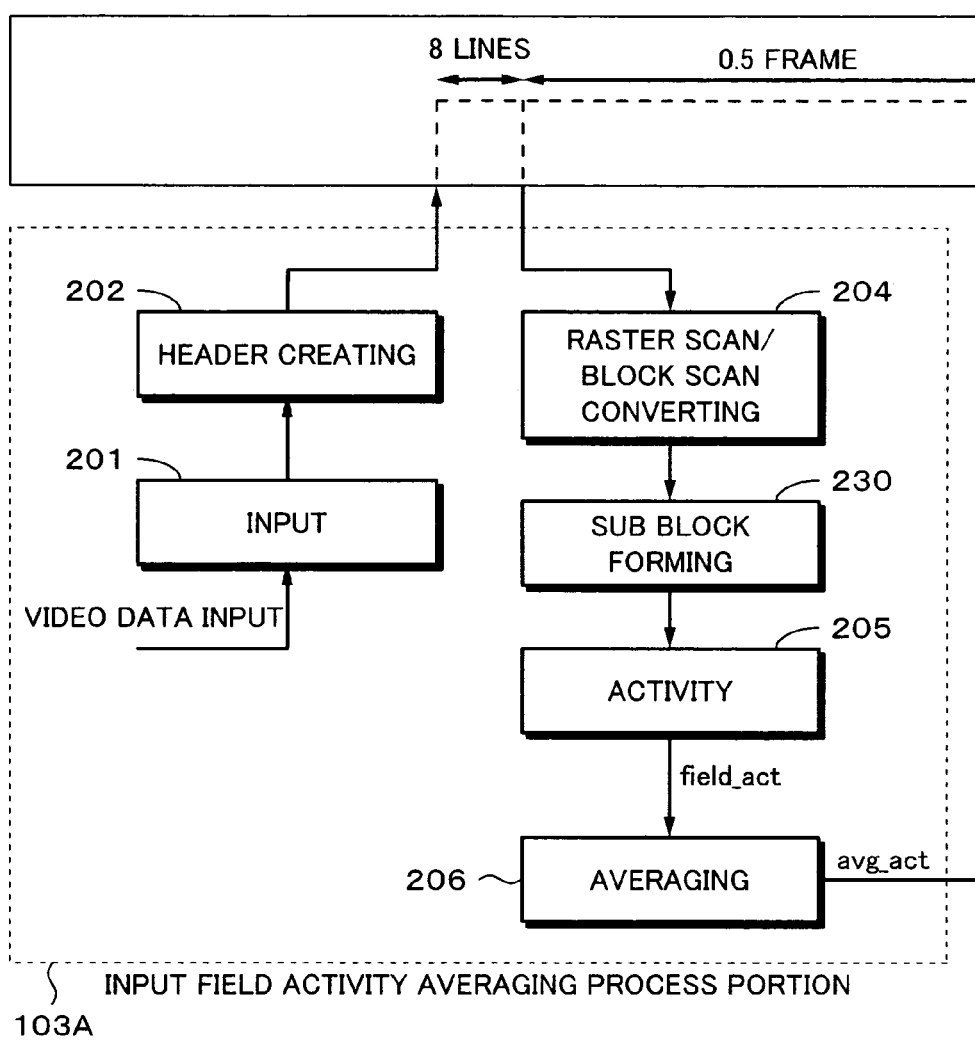
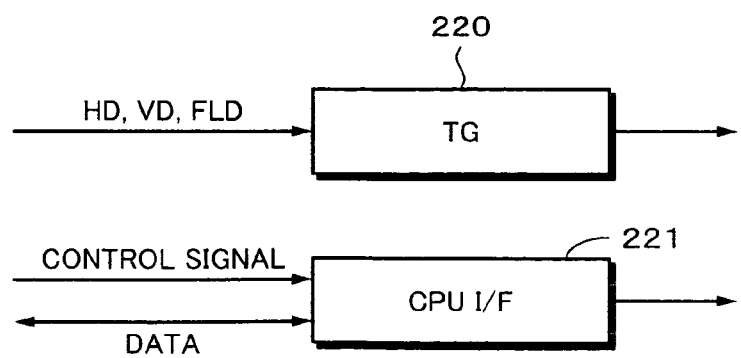

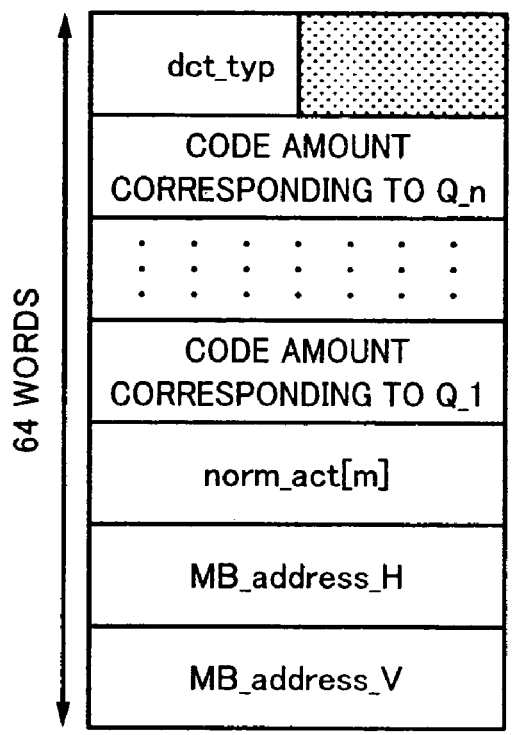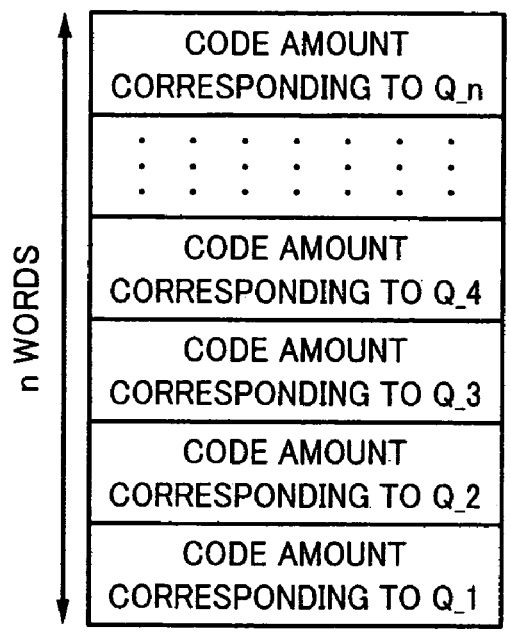
Fig. 12A
Fig. 12B

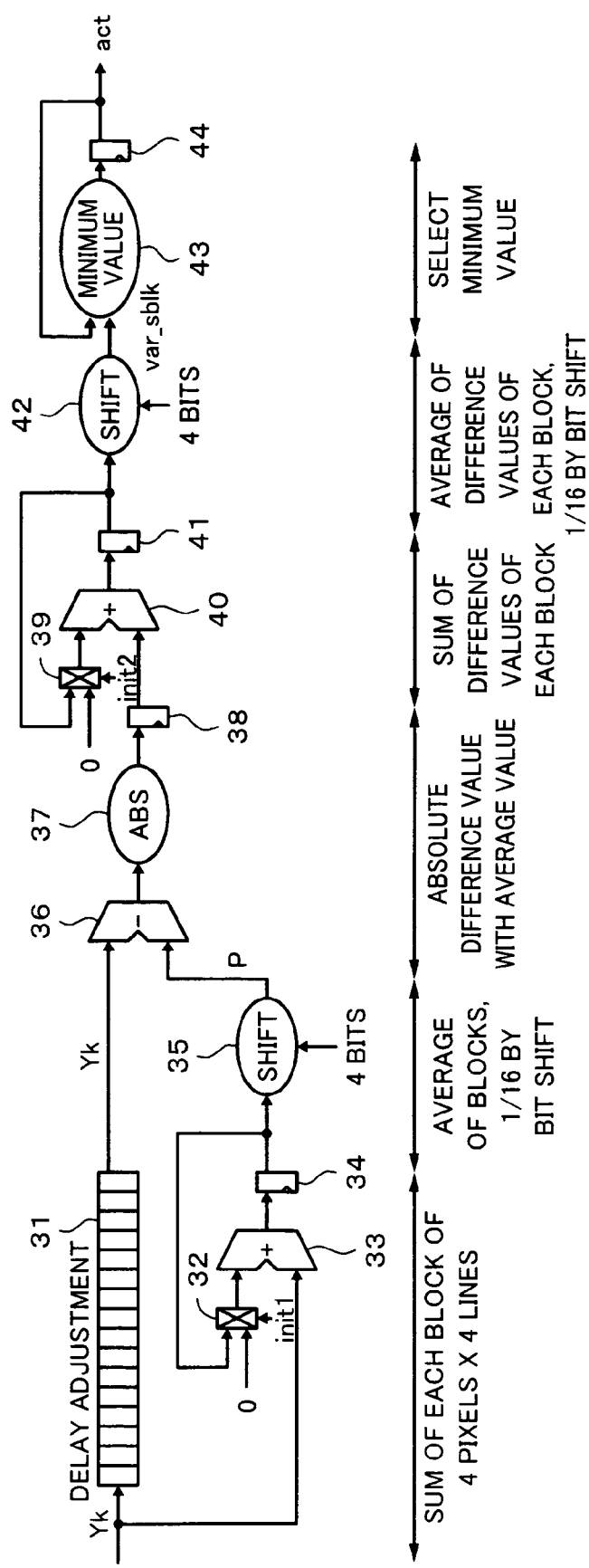

IMAGE PROCESSING DEVICE, IMAGE PROCESSING METHOD, IMAGE PROCESSING PROGRAM AND RECORDING MEDIUM

TECHNICAL FIELD

The present invention relates to a picture processing apparatus, a picture processing method, a picture processing program, and a recording medium for compression-encoding picture data by quantizing picture data in the unit of one block.

BACKGROUND ART

In a conventional picture data compression-encoding system, picture data is quantized in the unit of one block that is composed of a predetermined number of pixels. For example, in the MPEG2 (Moving Pictures Experts Group 2), such a compression-encoding system is used. In the MPEG2, picture data is transformed in the unit of one block that is composed of a plurality of pixels by the DCT (Discrete Cosine Transform) method. The obtained DCT coefficients are quantized. As a result, the picture data has been compression-encoded. In the MPEG2, a quantizer step is designated with a quantizer scale.

In a conventional picture quality optimizing method using the compression-encoding of the MPEG2, an activity that is a coefficient that represents the complexity and smoothness of a picture to be compressed is calculated. With an adaptive quantization based on the activity, the picture quality is optimized.

This method is performed as follows. In a simple and smooth picture region, when the compressing process is performed, the deterioration of the picture quality is remarkable. In this region (referred to as plane region), the picture data is finely quantized with a quantizer scale whose quantizer step is small. In contrast, in a complicated picture region, when the compressing process is performed, the deterioration of the picture quality is not remarkable. In this region, the picture data is coarsely quantized with a quantizer scale whose quantizer step is large. Thus, with a limited code amount, the picture quality can be effectively optimized.

When picture data is compressed, as described above, each picture region is divided into pixel blocks each having a predetermined size. The picture data is quantized and DCT-transformed in the unit of one pixel block. The MPEG2 standard prescribes a block of eight pixels×eight lines as the minimum process unit. In addition, the MPEG2 standard prescribes that each block of eight pixels×eight lines should be DCT-transformed and that the resultant DCT coefficients are quantized in the unit of a macro block of 16 pixels×16 lines.

On the other hand, although the MPEG2 standard does not clearly prescribe the unit for calculating the forgoing activity, however, the MPEG2 TM5 (Test Model 5) has proposed that the activity should be processed in the unit of one sub block of eight pixels×eight lines, which is the same as one DCT block.

Next, the activity calculating method in "adaptive quantization considering visual characteristic" that has been proposed in the MPEG2 TM5 will be described.

The adaptive quantization is to vary a quantizer scale Qj that depends on the state of a picture with an activity of each macro block so as to control the generated code amount of for example one frame and improve the picture quality. The quantizer scale Qj is varied with the activity so that in a plane region, where the deterioration of the picture quality is remarkable, the picture data is quantized with the quantizer scale Qj whose quantizer step is small and in a complicated picture region, where the deterioration of the picture quality is not remarkable, the picture data is quantized with the quantizer scale Qj whose quantizer step is large.

The activity is obtained with pixel values of a luminance signal of an original picture rather than a predictively error. In other words, the activity is obtained by calculating the following Formulas (1) to (3) in the reverse order for the j-th macro block with four blocks of the frame DCT encoding mode and four blocks of the field DCT encoding mode.

$$act_j = 1 + \min [sblk=1, 8](var\_sblk) \quad (1)$$

$$var\_sblk = 1/64 \Sigma[k=1, 64](Pk-Pavg)^2 \quad (2)$$

$$Pavg = 1/64 \Sigma[k=1, 64] P_k \quad (3)$$

where $P_k$ is a pixel value of a block of a luminance signal of the original picture. In Formula (3), 64 pixel values of a block of 8×8 are summed and the result is divided by 64. As a result, the average value Pavg of the pixel values is obtained. Next, in Formula (2), the difference between the average value Pavg and Pk is obtained. As a result, the average difference value var_sblk of the block of 8×8 is calculated. In Formula (1), with the minimum value of the average difference values var_sblk, the activity $act_j$ of the macro block is obtained. The minimum value is used because even if a part of the macro block contains a plain portion, it is necessary to finely quantize the macro block.

As described above, in the MPEG2 MT5, an activity is calculated for each sub block composed of eight pixels×eight lines, which is the same as one DCT block. The minimum activity of the activities of eight sub block is selected. The selected minimum activity is determined as the activity of the macro block.

This method is effective when the compression rate is high and the code amount is not affordable. However, when the compression rate is low and the code amount is relatively affordable, if this method is simply applied, since the picture quality is high, so-called mosquito noise becomes remarkable when a macro block contains even a small plain region.

Now, the mosquito noise will be described in brief. When high frequency components of DCT coefficients are coarsely quantized, at an edge portion 10A of an object 10 on a screen shown in FIG. 1A, ringing 11 shown in FIG. 1B takes place. When the edge portion 10A of the object 10 moves, since the separating method for a DCT block 12 varies. As a result, the state of the ringing 11 varies, which looks like a mosquito flies around the edge portion 10A. Thus, this phenomenon is called mosquito noise. When the periphery of the edge portion 10A is a plane region, the mosquito noise takes place very much.

As described above, when the entire picture is in high quality, if mosquito noise takes place in a plane region, the mosquito noise becomes more remarkable. Thus, when the compression rate is low-namely the code amount is affordable, it is very effective to cause a quantizer scale Qj of a macro block that contains even a small plain region to have a finer quantizer step.

Therefore, an object of the present invention is to provide a picture processing apparatus, a picture processing method, a picture processing program, and a recording medium that suppress the occurrence of mosquito noise in a macro block that contains even a small plain region.

DISCLOSURE OF INVENTION

The present invention is a picture processing apparatus, comprising transforming means for performing a transforming process for picture data in the unit of a transforming block and outputting transformed coefficients as a result of the transforming process, activity detecting means for calculating an activity in the unit of a plurality of sub blocks contained in the transforming block of the picture data and outputting an activity of a block composed of the plurality of transforming blocks with the activity of each of the sub blocks, and quantizing means for deciding a quantizer scale of the block according to the activity output from the activity detecting means and quantizing the transformed coefficients output from the transforming means with the quantizer scale.

The present invention is a picture processing method, comprising the steps of performing a transforming process for picture data in the unit of a transforming block and outputting transformed coefficients as a result of the transforming process, calculating an activity in the unit of a plurality of sub blocks contained in the transforming block of the picture data and outputting an activity of a block composed of the plurality of transforming blocks with the activity of each of the sub blocks, and deciding a quantizer scale of the block according to the activity output at the activity detecting step and quantizing the transformed coefficients output at the transforming step with the quantizer scale.

The present invention is a picture processing program for causing a computer apparatus to execute a picture processing method for quantizing input picture data in the unit of one block, the picture processing method comprising the steps of calculating an activity in the unit of a plurality of sub blocks contained in the transforming block of the picture data and outputting an activity of a block composed of the plurality of transforming blocks with the activity of each of the sub blocks, and deciding a quantizer scale of the block according to the activity output at the activity detecting step and quantizing the transformed coefficients output at the transforming step with the quantizer scale.

The present invention is a recording medium on which a picture processing program for causing a computer apparatus to execute a picture processing method for quantizing input picture data in the unit of one block has been recorded, the picture processing method comprising the steps of calculating an activity in the unit of a plurality of sub blocks contained in the transforming block of the picture data and outputting an activity of a block composed of the plurality of transforming blocks with the activity of each of the sub blocks, and deciding a quantizer scale of the block according to the activity output at the activity detecting step and quantizing the transformed coefficients output at the transforming step with the quantizer scale.

As described, a transforming process is performed for picture data in the unit of a transforming block. Transformed coefficients as a result of the transforming process are output. An activity is calculated in the unit of a plurality of sub blocks contained in the transforming block of the picture data. An activity of a block composed of the plurality of transforming blocks with the activity of each of the sub blocks is output. A quantizer scale of the block is decided according to the activity of the block composed of the plurality of transforming blocks. The transformed coefficients are quantized with the quantizer scale. Thus, an activity of each sub block is more emphasized. The quality of a picture that has been adaptively quantized is optimized.

BRIEF DESCRIPTION OF DRAWINGS

FIG. 1A and FIG. 1B are schematic diagrams for explaining mosquito noise;

FIG. 7A and FIG. 7B are block diagrams showing the structure of an example of a digital VTR according to an embodiment of the present invention;

FIG. 8A, FIG. 8B, and FIG. 8C are schematic diagrams more practically showing an example of the structure of an MPEG encoder;

FIG. 12A and FIG. 12B are schematic diagrams showing examples of the structures of streams transferred in each portion of the MPEG encoder;

FIG. 18 is a schematic diagram showing an example of the structure of the sub block segmenting portion and the activity portion.

BEST MODES FOR CARRYING OUT THE INVENTION

Next, an embodiment of the present invention will be described. According to the present invention, the DCT (Discrete Cosine Transform) is performed in the unit of one block of eight pixels×eight lines, of which one macro block of 16 pixels×16 lines as an encoding unit is divided by four. When the obtained DCT coefficients are quantized corresponding to a quantizer scale, the macro block is divided into sub blocks each of which is composed of for example four pixels×four lines. An activity of each sub block is detected. Corresponding to the detected activities, an activity of each macro block is determined. Corresponding to the activity, a quantizer scale of each macro block is determined. With the determined quantizer scales, macro blocks are adaptively quantized.

Figures 2A, 2B:
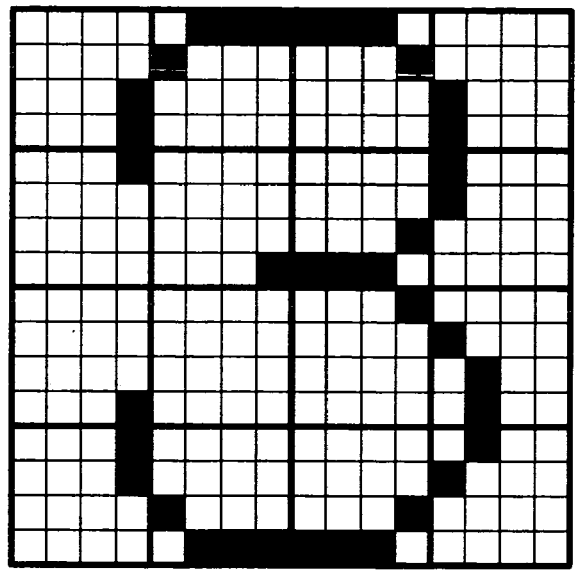
FIG. 2A and FIG. 2B are schematic diagrams for explaining the detection of activity according to the present invention.

With reference to FIG. 2A, FIG. 2B, FIG. 3A, and FIG. 3B, the activity detecting method according to the present invention will be described in comparison with that of the MPEG2 TM5 as the related art. In FIG. 2A, a macro block of 16 pixels×16 lines shows character "3". In this example, the pixel value of a black pixel is "16", whereas the pixel value of a white pixel is "0". The pixel value represents the luminance level of the pixel.

According to the present invention, the activity of a macro block is detected corresponding to the following procedure. First of all, a macro block of 16 pixels×16 lines is divided into sub blocks each of which is composed of four pixels×four lines. Using Formula (4), an average value P of luminance levels Yk of each sub block is obtained.

$$P = \frac{1}{16} \Sigma_{[k=1, 16]} Y_k \quad (4)$$

Thereafter, using Formula (5), the absolute values of the difference values between the luminance levels Yk of pixels of each sub block of four pixels×four lines and the average value P are obtained. In addition, the average value of the absolute values of the difference values is obtained as an average difference value var_sblk.

$$var\_sblk = \frac{1}{16} \Sigma_{[k=1, 16]} abs(Y_k - P) \quad (5)$$

One macro block is composed of 16 sub blocks each of which is composed of four pixels×four lines. The minimum value var_sblk is selected from the average difference values var_sblk of the 16 sub blocks, which compose one macro block. The selected minimum average difference value var_sblk is determined as an activity act of the macro block (Formula (6)).

$$act = \min_{[blk=1, 16]}(var\_sblk) \quad (6)$$

More practically, as shown in FIG. 2A, one macro block of 16 pixels×16 lines is divided into sub blocks each of which is composed of four pixels×four lines. Using Formula (4), the average value P of the luminance levels Yk of each sub block is obtained. For example, a sub block at the upper left corner shown in FIG. 2A has two pixels whose luminance levels are 16 each and 14 pixels whose luminance levels are 0 each. Thus, the average value $P=(16\times2+0\times14)/16=2$.

Next, using Formula (5), the absolute values of the differences between the average value P obtained using Formula (4) and the luminance level values of the pixels of the sub block are obtained. As a result, the difference average value var_sblk is calculated. In the example of the sub block at the upper left corner shown in FIG. 2A, the difference average value var_sblk = {abs(16−2)×+abs(0−2)×14}/16=3.5.

FIG. 2B shows the calculated results of Formula (4) and Formula (5) for sub blocks of one macro block. In FIG. 2B, the difference average value var_sblk is denoted by "var". The difference average value var_sblk has been obtained for each sub block. From them, using Formula (6), the minimum difference average value var_sblk is selected. In the example shown in FIG. 2B, the difference average value var_sblk of the sub block at the second rightward position and at the third downward position is "0", which is the minimum value. Thus, the activity act of the macro block is determined as "0".

Figure 3A:
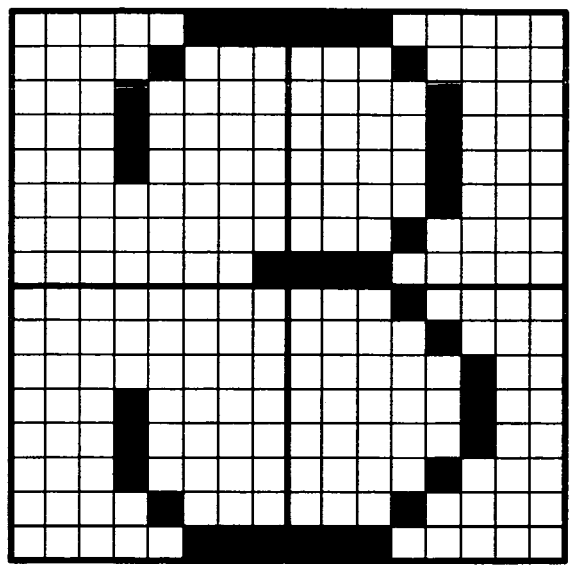
FIG. 3A and FIG. 3B are schematic diagrams for explaining the detection of an activity corresponding to the MPEG2 TM5.
Figure 3B:
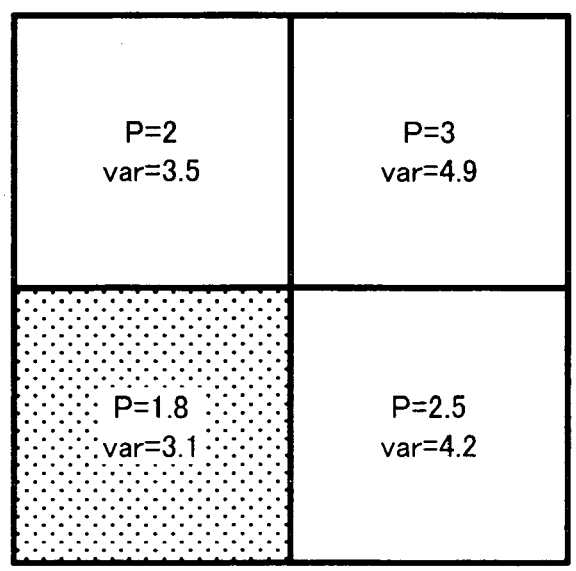

FIG. 3A and FIG. 3B are schematic diagram for explaining an activity detected according to the MPEG2 TM5. A picture (character "3") displayed in a macro block of 16 pixels×16 lines is the same as that shown in FIG. 2A. In the MPEG2 TM5, as shown in FIG. 3A, an activity is detected for sub blocks each of which is composed of eight pixels×eight lines, into which one macro block of 16 pixels×16 lines is divided.

Next, a sub block at the upper left of the macro block shown in FIG. 3A will be explained. Using Formula (3) described in the Related Art section, the average value $P_k$ of the luminance levels of the pixels of the sub block of eight pixels×eight lines is obtained. In the example, since the number of pixels whose luminance levels are 16 is eight and the luminance levels of the other pixels are 0. Thus, the average value $P_k=(16\times8+0\times56)/64=2$. Using Formula (2), the difference average value var_sblk of the sub blocks becomes var_sblk={abs(16−2)×8+abs(0−2)×56}/64=3.5.

FIG. 3B shows the calculated results of Formula (3) and Formula (2) for sub blocks of one macro block. In FIG. 3B, the difference average value var_sblk is denoted by "var". The minimum difference average value var_sblk=3.1 is selected from the difference average values var_sblk of the sub blocks. Thus, the activity act of the macro block is determined as "3.1".

Thus, when the activity calculating method according to the present invention is applied to a macro block that contains even a small plain portion, the activity value of the macro block can be more suppressed than that of the MPEG2 TM5 as the related art. In other words, according to the present invention, since a macro block is divided into sub blocks which are smaller than those according to the MPEG2 TM5, the probability that a plain portion of a macro block is detected becomes high. Thus, the activity of a macro block that contains a so-called edge portion such as a character or a contour portion of an image can be suppressed. As a result, mosquito noise can be suppressed.

Figure 4:
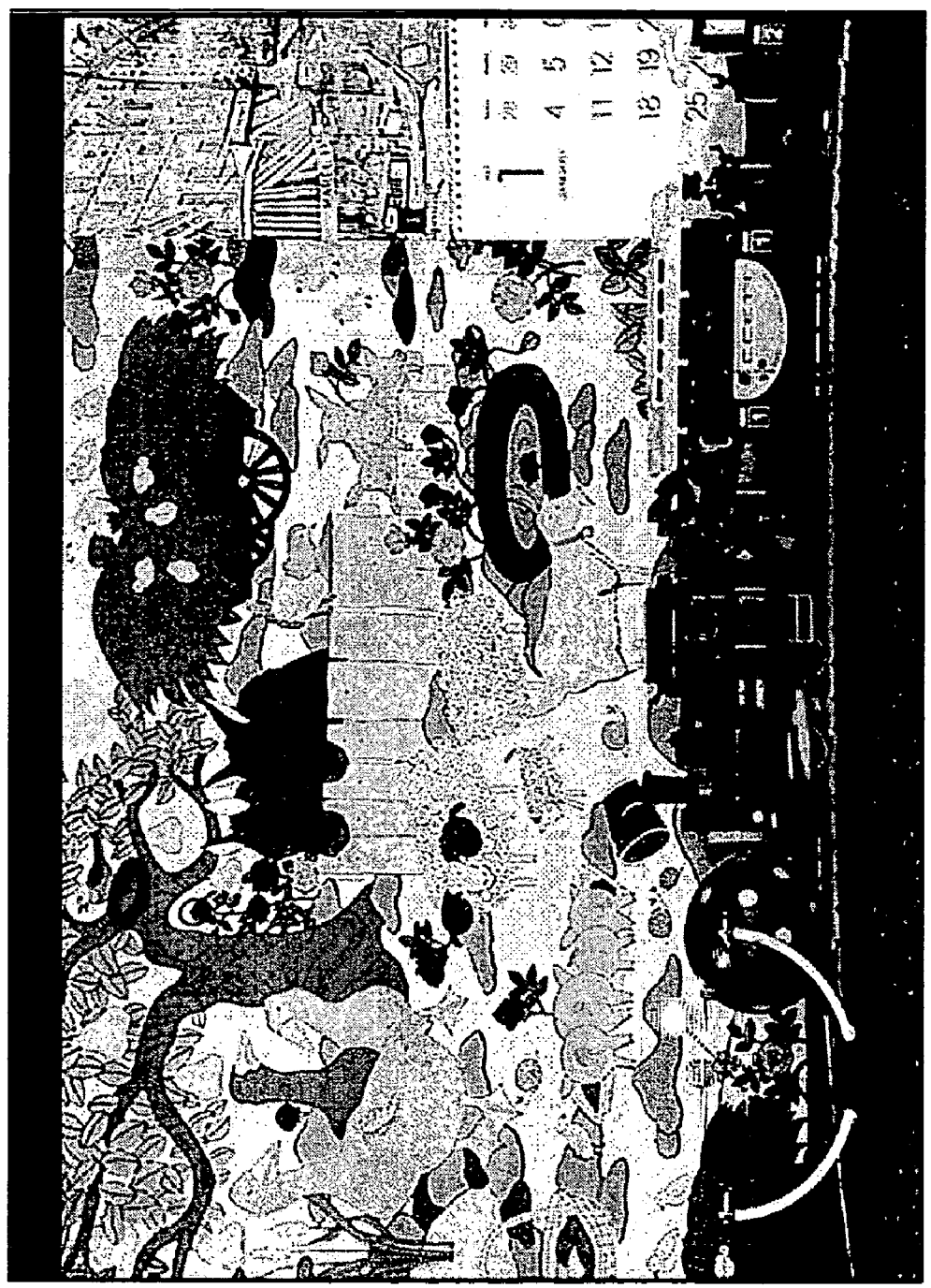
FIG. 4 is a sample picture for explaining a calculated result of an activity of a real picture.

Next, with reference to FIG. 4, FIG. 5, and FIG. 6, the calculated result of an activity of a real picture will be described. A sample picture shown in FIG. 4 is entirely plane. In particular, the picture contains edges at boarder portions of patterns drawn on the background portion and character portions of a calendar.

Figure 5:
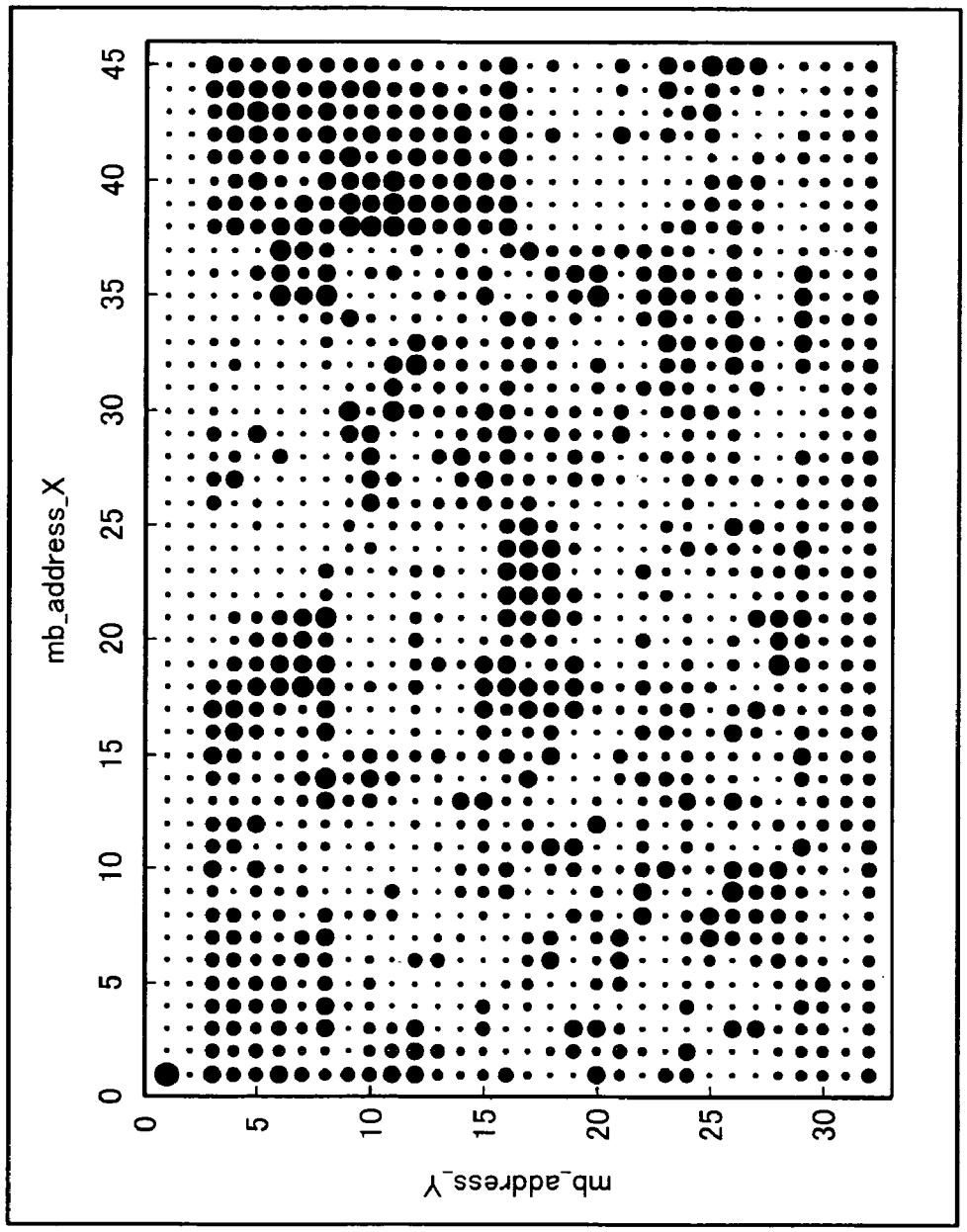
FIG. 5 is a schematic diagram showing an example of the distribution of activities on a screen corresponding to the MPEG2 TM5.
Figure 6:
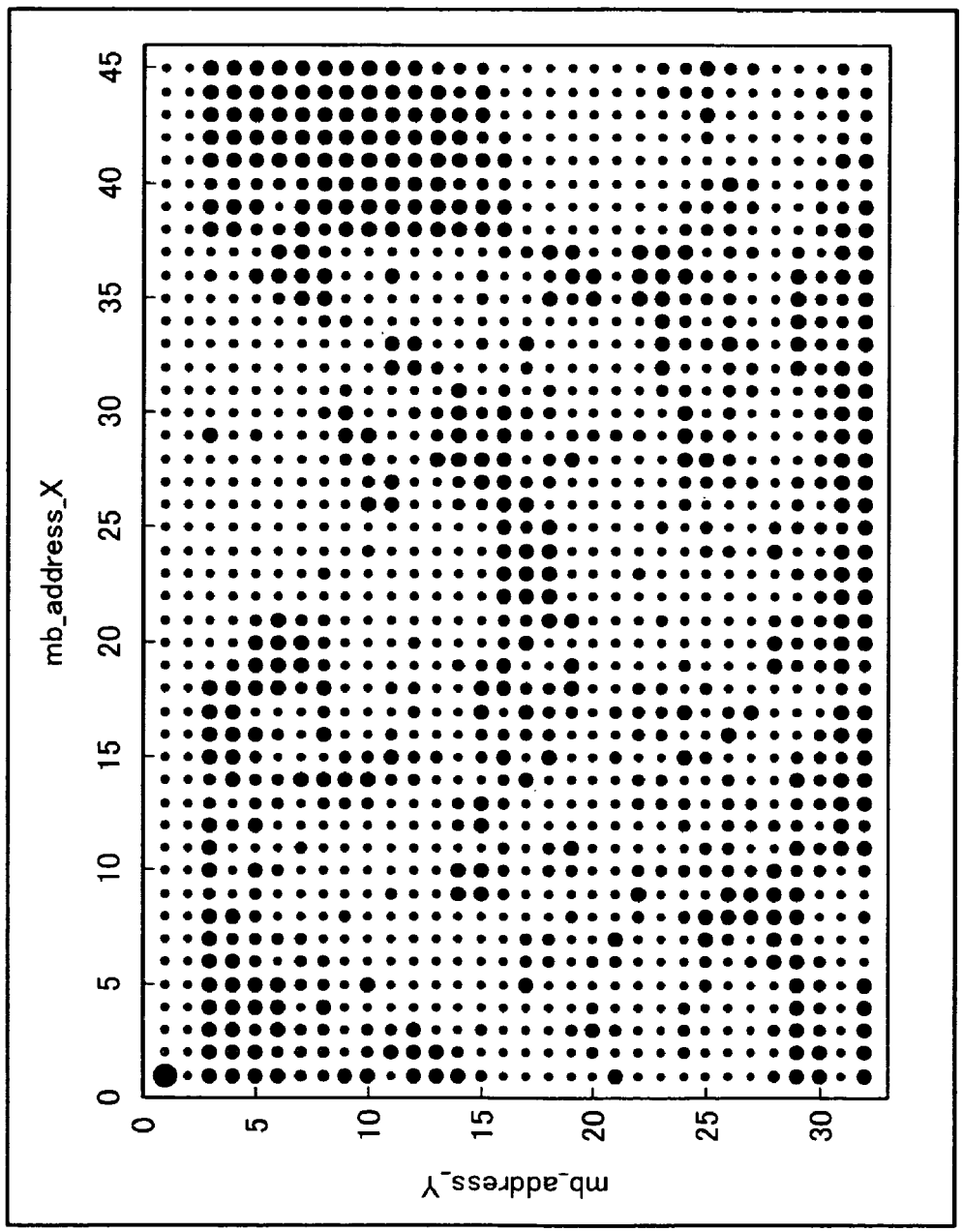
FIG. 6 is a schematic diagram showing an example of the distribution of activities on a screen according to the present invention.

FIG. 5 and FIG. 6 show the distribution of activities of the sample picture shown in FIG. 4 according to the MPEG2 TM5 and that according to the present invention, respectively. In FIG. 5 and FIG. 6, diameters of black circles represent activity values of macro blocks of the pictures.

When the activities according to the MPEG2 TM5 shown in FIG. 5 and the activities according to the present invention shown in FIG. 6 are compared, it is clear that the activities according to the present invention are suppressed to smaller values than those according to the MPEG2 TM5. With reference to FIG. 5, there are macro blocks that have very large activities in a plain portion (around at X=42 and Y=18 to 23) shown in FIG. 5, which is a center right portion of the calendar portion. In this portion, the quantization is coarsely performed. As a result, it is supposed that the mosquito noise becomes remarkable. In contrast, with reference to FIG. 6, the activities of the calendar portion according to the present invention are entirely suppressed. As a result, since the quantization is finely performed, the mosquito noise becomes unremarkable.

Figure 7B:
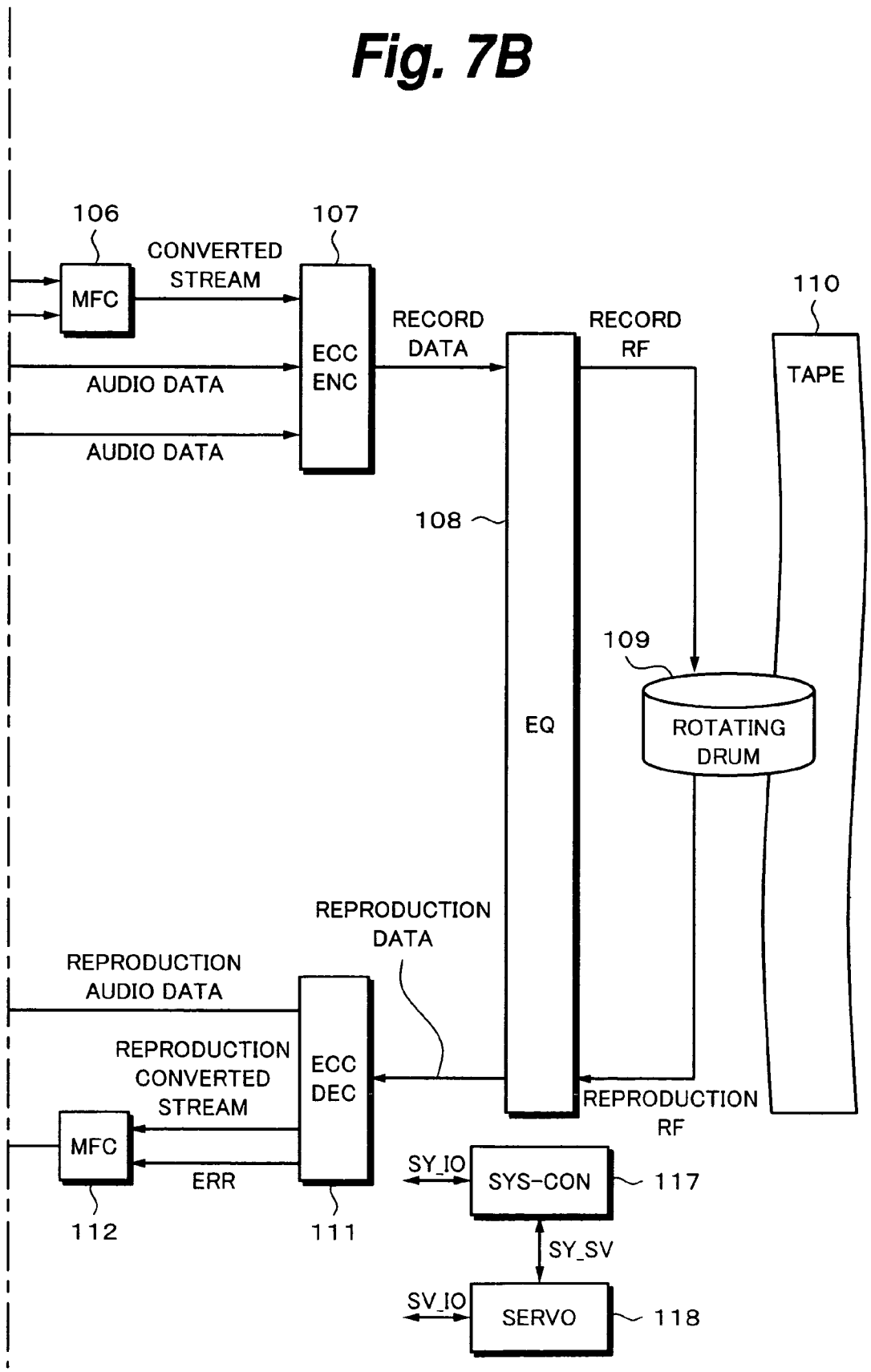

FIG. 7A and FIG. 7B show an example of the structure of a digital VTR according to an embodiment of the present invention. The digital VTR is designed to directly record a digital video signal that has been compression-encoded according to the MPEG system to a recording medium.

First of all, the structure and the processing operation of a recording system of the digital VTR will be described. Signals that are input from the outside to the recording system are two types of serial digital interface signals that are an SDI (Serial Data Interface) signal and an SDTI (Serial Data Transport Interface) signal, an analog interface signal, and an external reference signal REF that is a control signal.

The SDI is an interface prescribed by the SMPTE so as to transmit a (4:2:2) component video signal, a digital audio signal, and additional data. The SDTI is an interface through which an MPEG elementary stream (referred to as MPEG ES) that is a stream of which a digital video signal has been compression-encoded according to the MPEG system. The ES is 4:2:2 components. As described above, the ES is a stream of all I pictures having the relation of 1 GOP=1 picture. In the SDTI-CP (Content Package) format, the MPEG ES is separated into access units and packed to a packet in the unit of one frame. The SDTI-CP uses a sufficient transmission band (clock rate: 27 MHz or 36 MHz or stream bit rate: 270 Mbps or 360 Mbps). In one frame period, the ES can be transmitted as a burst.

The SDI signal transmitted through the SDI is input to an SDI input portion 101. An analog input signal as an analog video signal is input to an analog input portion 120. The analog input portion 120 converts the analog input signal into a digital signal, maps the digital signal to for example the aforementioned SDI format, and outputs the resultant SDI signal. The SDI signal, where the analog input signal has been converted and mapped to the SDI format, is supplied to the SDI input portion 101.

The SDI input portion 101 converts the supplied SDI signal as a serial signal into a parallel signal. In addition, the SDI input portion 101 extracts an input synchronous signal as an input phase reference from the SDI signal and outputs the extracted input synchronous signal to a timing generator TG 102.

In addition, the SDI input portion 101 separates a video signal and an audio signal from the converted parallel signal. The separated video input signal and audio signal are output to an MPEG encoder 103 and a delay circuit 104, respectively.

The timing generator TG 102 extracts a reference synchronous signal from an input external reference signal REF. In synchronization with a designated one of the reference synchronous signal or the input synchronous signal, which has been supplied from the SDI input portion 101, the timing generator TG 102 generates a timing signal necessary for the digital VTR and supplies it as timing pulses to each block.

The MPEG encoder 103 converts the input video signal into coefficient data according to the DCT method, quantizes the coefficient data, and encodes the quantized data with a variable length code. Variable-length-coded (VLC) data, which has been output from the MPEG encoder 103, is an elementary stream (ES) according to the MPEG2. The elementary stream, which has been output from the MPEG encoder 103, is supplied to one of input terminals of a recording side multi-format converter (hereinafter referred to as recording side MFC).

The delay circuit 104 functions as a delay line that delays the input audio signal as non-compressed signal corresponding to the delay of the video signal of the MPEG encoder 103. The audio signal, which has been delayed by the delay circuit 104, is output to an ECC encoder 107. This is because the digital VTR according to the embodiment of the present invention treats the audio signal as a non-compressed signal.

The SDTI signal supplied from the outside through the SDTI is input to an SDTI input portion 105. The SDTI input portion 105 detects the synchronization of the SDTI signal. The SDTI signal is temporarily buffered and the elementary stream is extracted therefrom. The extracted elementary stream is supplied to the other input terminal of the recording side MFC 106. The synchronous signal, which has been synchronously detected, is supplied to the timing generator TG 102 (not shown).

The SDTI input portion 105 extracts a digital audio signal from the input SDTI signal. The extracted digital audio signal is supplied to the ECC encoder 107.

In the digital VTR according to the present invention, an MPEG ES can be directly input independent from the base band video signal, which has been input from the SDI input portion 101.

The recording side MFC 106 has a stream converter and a selector. The recording side MFC 106 selects one of the MPEG ES supplied from the SDI input portion 101 and the MPEG ES supplied from the SDTI input portion 105, and collects DCT coefficients of DCT blocks of one macro block so that frequency components are rearranged in the order of frequency components. The resultant stream, of which the coefficients of the MPEG ES have been rearranged, is referred to as converted elementary stream. Since the MPEG ES is rearranged, when a search reproduction is performed, as many DC coefficients and low order AC coefficients can be collected as possible, which contributes the improvement of the quality of the search picture. The converted elementary stream is supplied to the ECC encoder 107.

A main memory (not shown) having a large storage capacity is connected to the ECC encoder 107. The ECC encoder 107 has a packing and shuffling portion, an audio outer code encoder, a video outer code encoder, an inner code encoder, an audio shuffling portion, a video shuffling portion, and so forth. In addition, the ECC encoder 107 has an sync block ID adding circuit and a synchronous signal adding circuit. According to the first embodiment of the present invention, as an error correction code for the video signal and audio signal, a product code is used. In the product code, a data symbol is dually encoded in such a manner that the two-dimensional array of the video signal or audio signal is encoded in the vertical direction with an outer code and that the two-dimensional array is encoded in the horizontal direction with an inner code. As the outer code and inner code, the Reed-Solomon code can be used.

The converted elementary stream, which has been output from the recording side MFC 106, is supplied to the ECC encoder 107. In addition, the audio signals, which are output from the SDTI input portion 105 and the delay circuit 104, are supplied to the ECC encoder 107. The ECC encoder 107 shuffles the converted elementary stream and audio signals, encodes them with an error correction code, adds IDs and a synchronous signal to sync blocks, and outputs the resultant signal as record data.

The record data, which has been output from the ECC encoder 107, is converted into a record RF signal by the equalizer EQ 108 that has a recording amplifier. The record RF signal is supplied to a rotating drum 109. The rotating drum 109 records the record signal on a magnetic tape 110. The rotating drum 109 has a rotating head disposed in a predetermined manner. In reality, a plurality of magnetic heads whose azimuths are different from each other and that form adjacent tracks are disposed.

When necessary, the record data may be scrambled. When data is recorded, it may be digitally modulated. In addition, the partial response class 4 and Viterbi code may be used. The equalizer EQ 108 has both a recording side structure and a reproducing side structure.

Next, the structure and the processing operation of the reproducing system of the digital VTR will be described. In the reproduction mode, a reproduction signal that is reproduced from the magnetic tape 110 by the rotating drum 109 is supplied to the reproducing side structure of the equalizer EQ 108 that has a reproducing amplifier and so forth. The equalizer EQ 108 equalizes the reproduction signal and trims the wave shape thereof. When necessary, the equalizer EQ 108 demodulates the digital modulation and decodes the Viterbi code. An output of the equalizer EQ 108 is supplied to an ECC decoder 111.

The ECC decoder 111 performs the reverse process of the ECC encoder 107. The ECC decoder 111 has a main memory having a large storage capacity, an inner code decoder, an audio deshuffling portion, a video deshuffling portion, and an outer code decoder. In addition, the ECC decoder 111 has a deshuffling and depacking portion and a data interpolating portion for video data. Likewise, the ECC decoder 111 has an audio AUX separating portion and a data interpolating portion for audio data.

The ECC decoder 111 detects the synchronization of reproduction data. In other words, the ECC decoder 111 detects a synchronous signal added at the beginning of a sync block and extracts the sync block from the reproduction signal. The ECC decoder 111 corrects an error of each sync block of the reproduction data with an inner code. Thereafter, the ECC decoder 111 performs an ID interpolating process for each sync block. The ECC decoder 111 separates video data and audio data from the reproduction data, where IDs have been interpolated. The ECC decoder 111 deshuffles the video data and audio data so that they are restored to the original data. The ECC decoder 111 corrects an error of the deshuffled data with an outer code.

When the ECC decoder 111 cannot correct an error of data, which exceeds its error correcting performance, the ECC decoder 111 sets an error flag to the data. For an error of video data, the ECC decoder 111 outputs a signal ERR that represents that data has an error.

The reproduction audio data, whose error has been corrected, is supplied to an SDTI output portion 115. A delay circuit 114 delays the reproduction audio data for a predetermined amount and supplies the delayed reproduction audio data to an SDI output portion 116. The delay circuit 114 absorbs the delay of the video data processed in an MPEG decoder 113 that will be described later.

On the other hand, the video data, whose error has been corrected, is supplied as converted reproduction elementary stream to a reproducing side MFC circuit 112. The aforementioned signal ERR is also supplied to the reproducing side MFC circuit 112. The reproducing side MFC circuit 112 performs the reverse process of the recording side MFC 106. The reproducing side MFC circuit 112 has a stream converter. The stream converter performs the reverse process of the recording side stream converter. In other words, the stream converter rearranges DCT coefficients arranged in the order of frequency components to those arranged in the order of DCT blocks. As a result, the reproduction signal is converted into an elementary stream according to the MPEG2. At that point, when the signal ERR is supplied from the ECC decoder 111 to the reproducing side MFC circuit 112, it replaces the corresponding data with a signal that perfectly complies with the MPEG2.

The MPEG ES, which has been output from the reproducing side MFC circuit 112, is supplied to the MPEG decoder 113 and the SDTI output portion 115. The MPEG decoder 113 decodes the supplied MPEG ES so as to restore it to the original video signal, which has not been compressed. In other words, the MPEG decoder 113 performs an inversely quantizing process and an inverse DCT process for the supplied MPEG ES. The decoded video signal is supplied to an SDI output portion 116.

As described above, the audio data, which had been separated from the video data by the ECC decoder 111, has been supplied to the SDI output portion 116 through the delay circuit 114. The SDI output portion 116 maps the supplied video data and audio data in the SDI format so as to convert them into the SDI signal having the SDI data structure. The SDI signal is output to the outside.

On the other hand, as described above, the audio data, which had been separated from the video data by the ECC decoder 111, has been supplied to the SDTI output portion 115. The SDTI output portion 115 maps the video data and audio data as the supplied elementary stream in the SDTI format so as to convert them into the SDTI signal having the SDTI data structure. The SDTI signal is output to the outside.

A system controller 117 (abbreviated as sys-con 117 in FIG. 7A and FIG. 7B) is composed of for example a micro computer. The system controller 117 communicates with each block using a digital signal SY_IO so as to control the entire operation of the digital VTR. A servo 118 communicates with the system controller 117 using a signal SY_SV. Using the signal SV_IO, the servo 118 controls the traveling of the magnetic tape 110 and drives and controls the rotating dram 109.

Figure 8B:
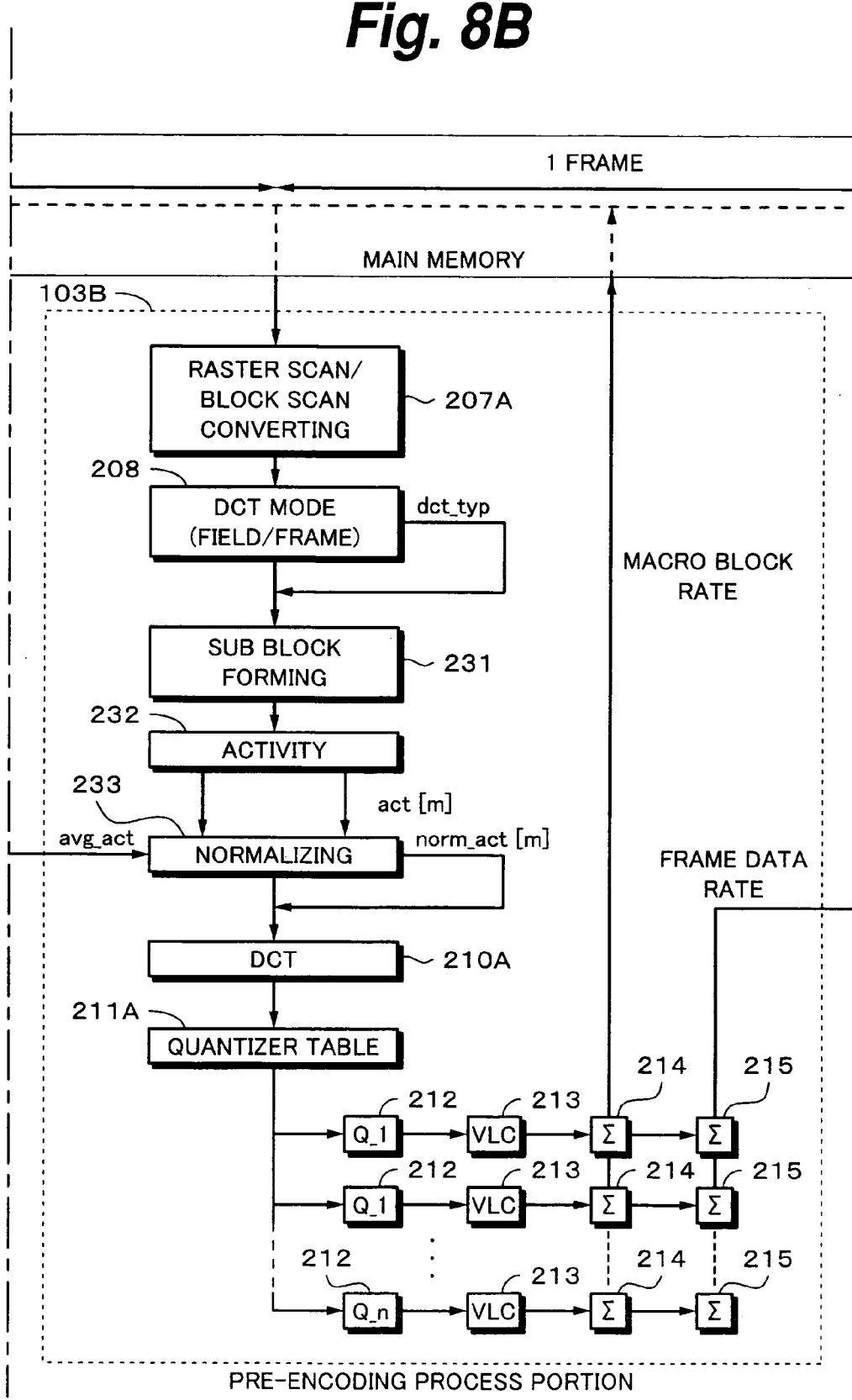
Figure 8C:
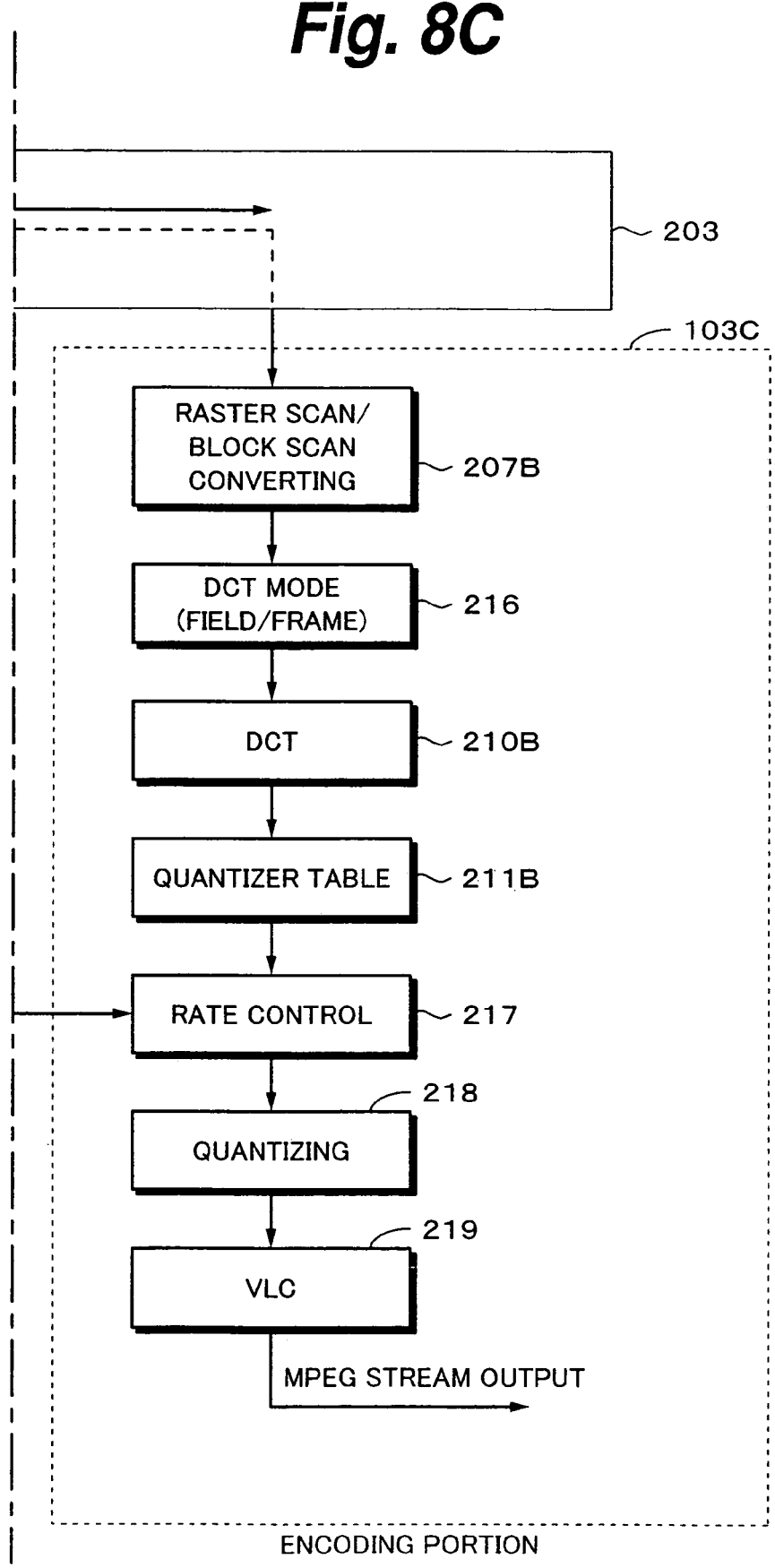

FIG. 8A, FIG. 8B, and FIG. 8C more practically show the structure of the forgoing example of the MPEG encoder. FIG. 9A, FIG. 9B, FIG. 9C, FIG. 10A, FIG. 10B, FIG. 10C, FIG. 11A, FIG. 11B, FIG. 12A, FIG. 12B, FIG. 13A, FIG. 13B, FIG. 13C, FIG. 14A, FIG. 14B, FIG. 14C, and FIG. 15 show examples of the structures of streams transferred in the individual portions of FIG. 8A, FIG. 8B, and FIG. 8C.

The MPEG encoder 103 is composed of an input field activity averaging process portion 103A, a pre-encoding process portion 103B, and an encode portion 103C. The input field activity averaging process portion 103A obtains the average value of activities of the input video data and supplies the obtained average value to the pre-encoding process portion 103B. The pre-encoding process portion 103B estimates the generated code amount of quantized input video data with the average value of the activities. According to the estimated result, while controlling the code amount, the encode portion 103C actually quantizes the input video data, encodes the quantized video data with a variable length code, and outputs the resultant data as an MPEG ES.

A timing generator 220 generates a timing signal necessary for the MPEG encoder 103 with a horizontal synchronous signal HD, a vertical synchronous signal VD, and a field synchronous signal FLD that have been supplied from for example the timing generator TG 102 shown in FIG. 7. A CPU I/F block 221 is an interface with the system controller 117 shown in FIG. 7. With a control signal and data transferred through the CPU I/F block 221, the operation of the MPEG encoder 103 is controlled.

First of all, the process of the input field activity averaging process portion 103A will be described. Video data, which has been output from the SDI input portion 101 and input to the MPEG encoder 103, is supplied to an input portion 201. The input field activity averaging process portion 103A converts the video data into data that can be stored in a main memory 203 and checks a parity for the video data. The video data, which has been output from the input portion 201, is supplied to a header creating portion 202. Using a vertical blanking region or the like, headers according to the MPEG, for example sequence_header, quantizer_matrix, and gop_header, are extracted. The extracted headers are stored in the main memory 203. These headers are designated mainly by the CPU I/F block 221. In other than the vertical blanking region, in the header creating portion 202, the video data supplied from the input portion 201 is stored in the main memory 203.

The main memory 203 is a frame memory for a picture. The main memory 203 rearranges video data and absorbs the system delay. The video data is rearranged by for example an address controller (not shown) that controls read addresses of the main memory 203. In FIG. 8A, FIG. 8B, and FIG. 8C, 8 lines, 0.5 frame, and 1 frame in the block of the main memory 203 represent delay values as read timings of the main memory 203. They are properly controlled corresponding to a command issued from the timing generator TG 220.

A raster scan/block scan converting portion 204 extracts macro blocks according to the MPEG from each line of the video data, which has been stored in the main memory 203, and supplies the extracted macro blocks to a sub block forming portion 230 disposed downstream thereof. According to the embodiment, with only the first field, activities are calculated. Thus, the macro blocks that are output from the raster scan/block scan converting portion 204 are composed of video data of the first field.

Figure 9A:
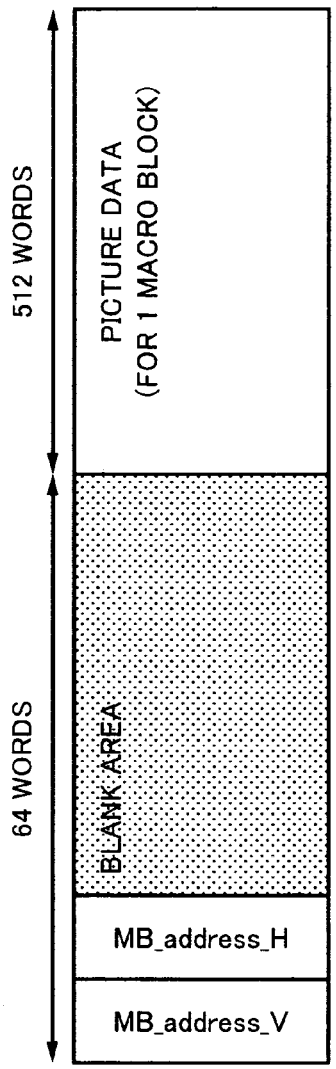
FIG. 9A, FIG. 9B, and FIG. 9C are schematic diagrams showing examples of structures of streams transferred in each portion of the MPEG encoder.

As shown in FIG. 9A, at the beginning of the stream that is output from the raster scan/block scan converting portion 204, address information of the vertical and horizontal directions of the macro block are placed. The address information is followed by a blank area having a predetermined size, followed by picture data for one macro block.

The stream has a data length of 576 words each of which is composed of for example eight bits. The last 512 words (referred to as data portion) are assigned a picture data area for one macro block. The first 64 words (referred to as header portion) contain the aforementioned address information of the macro block. The other portion is a blank area for data and flags embedded by each portion disposed downstream of the raster scan/block scan converting portion 204.

A macro block according to the MPEG is a matrix of 16 pixels×16 lines. However, as described later with reference to FIGS. 16A and 16B, the input field activity averaging process portion 103A performs the process for obtaining activities with only the first field. Thus, when eight lines of the first field have been stored in the main memory 203, the process can be started. In reality, corresponding to a command issued from the timing generator TG 220, the process is properly started.

Figure 16A:
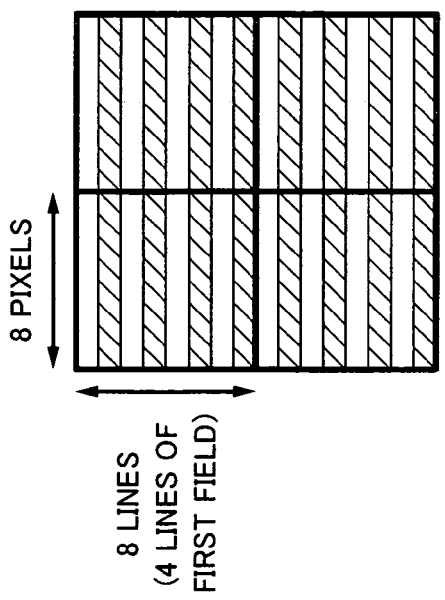
FIGS. 16A and 16B are schematic diagrams showing an example of a macro block subdividing process of a sub block segmenting portion.
Figure 16B:
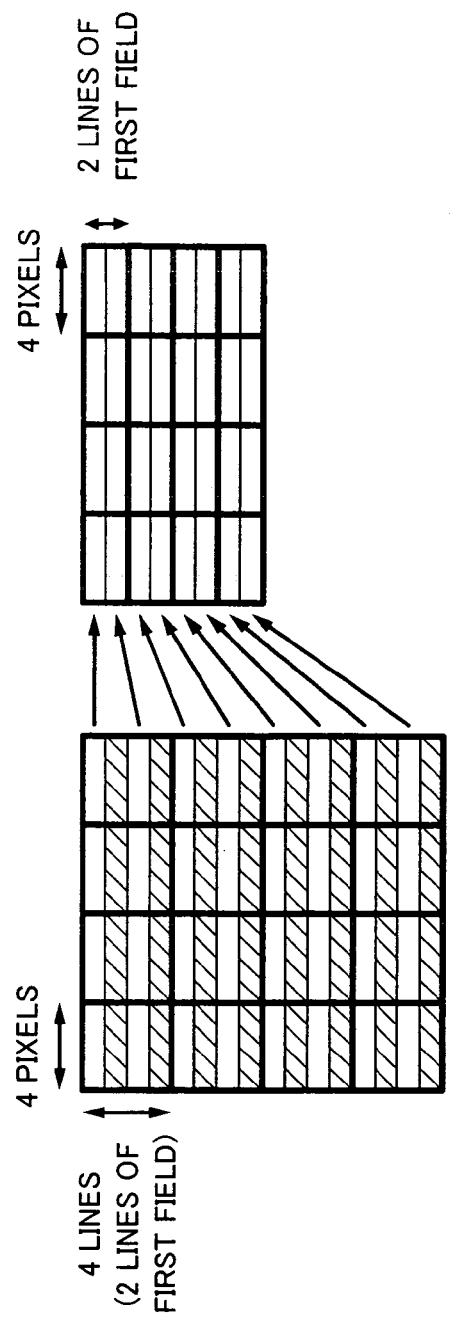

The sub block forming portion 230 subdivides the macro block of one field supplied from the raster scan/block scan converting portion 204 into sub blocks. FIG. 16A and FIG. 16B show an example of the macro block subdividing process of the sub block forming portion 230. As shown in FIG. 16A, the macro block, which has been supplied from the raster scan/block scan converting portion 204, is composed of four DCT blocks, each of which is composed of eight pixels×eight lines. Since the input field activity averaging process portion 103A obtains the average activity using only the first field, line data of the second field hatched does not exist.

The macro block of 16 pixels×16 lines is subdivided into sub blocks each of which is composed of four pixels×four lines as shown on the left side of FIG. 16B. Finally, 16 sub blocks of only data of the first field are formed as shown in FIG. 16B. Each of the 16 sub blocks is composed of four pixels×two lines.

An output of the sub block forming portion 230 is supplied to an activity portion 205. The activity portion 205 obtains field_act of each macro block of the first field. Using Formula (7), the average value P of the luminance levels Yk of four pixels×two lines of each sub block is obtained.

$$P = \frac{1}{8}\Sigma[k=1, 8]yk \qquad (7)$$

Next, using Formula (8), the absolute values of the difference values between the luminance levels Yk of the pixels and the average value P of each sub block are obtained. Next, the average difference value var_sblk of the absolute values of the difference values is obtained.

$$var\_sblk = \frac{1}{8}\Sigma[k=1, 8]abs(Yk-P) \qquad (8)$$

Since one macro block is composed of 16 sub blocks, the minimum value is selected from 16 average difference values var_sblk of 16 sub blocks (Formula (9)). The selected average difference value var_sblk is referred to as the activity field_act of the macro block of the first field.

$$field\_act = \min[blk=1, 16](var\_sblk) \qquad (9)$$

The activities field_act of macro blocks of the first field are supplied to an averaging portion 206. The averaging portion 206 cumulates the activities field_act of the macro blocks of the first field and obtains the average value avg_act of the activities field_act (the average value is referred to as average activity) (Formula (10)). In Formula (10), MBnum represents the total number of macro blocks in one frame.

$$avg\_act = 1/MBnum\Sigma[m=1. MBnum]field\_act[m] \qquad (10)$$

The average value avg_act is supplied to a normalizing portion 233 (that will be described later) of the pre-encoding process portion 103B. As will be described later, with the average value avg_act, the normalizing portion 233 normalizes the activity of each macro block. The normalizing portion 233 performs the normalizing process with the average value avg_act for the first field and the second field. Thus, after the average value avg_act of the activities of the first field has been obtained, with the average value, the pre-encoding process can be performed in consideration of the adaptive quantization.

Next, the pre-encoding process portion 103B will be described. A raster scan/block scan converting portion 207A performs basically the same process as the raster scan/block scan converting portion 204. However, the raster scan/block scan converting portion 207A requires video data of both the first field and second field to perform the pre-encoding process for estimating the code amount. Thus, when eight lines of the second field have been stored to the main memory 203, the raster scan/block scan converting portion 207A can form a macro block of 16 pixels×16 lines according to the MPEG. At that time, the process can be started. In reality, corresponding to a command issued from the timing generator TG 220, the process is properly started.

Video data that has been output from the raster scan/block scan converting portion 207A is supplied to a DCT mode portion 208. The DCT mode portion 208 decides to use the field DCT encoding mode or the frame DCT encoding mode to encode video data.

Figure 9B:
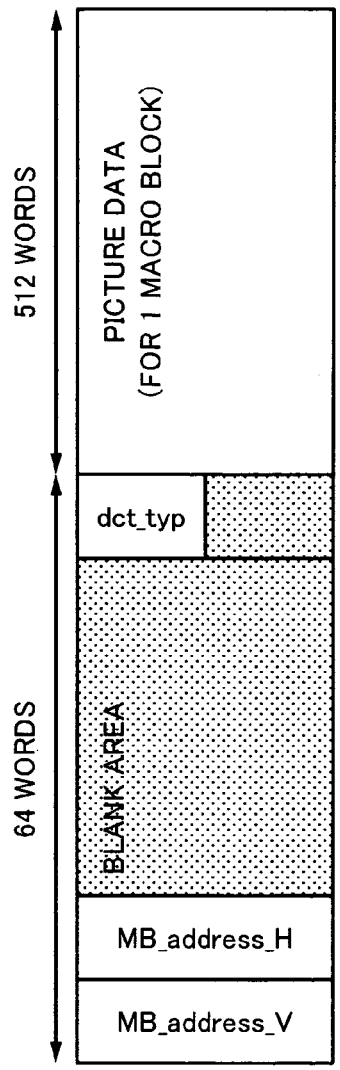

In this example, the sum of absolute values of difference values of adjacent pixels in the vertical direction is calculated in both the field DCT encoding mode and the frame DCT encoding mode. The sum calculated in the field DCT encoding mode is compared with the sum calculated in the frame DCT encoding mode. The encoding mode with the smaller value is selected. The selected result is temporarily inserted as DCT mode type data that is a flag in the stream that is sent to each portion downstream. As shown in FIG. 9B, the DCT mode type data dct_typ is placed on the rear end side of the blank area of the header portion.

A macro block that has been output from the DCT mode portion 208 is supplied to a sub block forming portion 231. The sub block forming portion 231 subdivides the supplied macro block into sub blocks each of which is composed of four pixels×four lines.

Figure 17A:
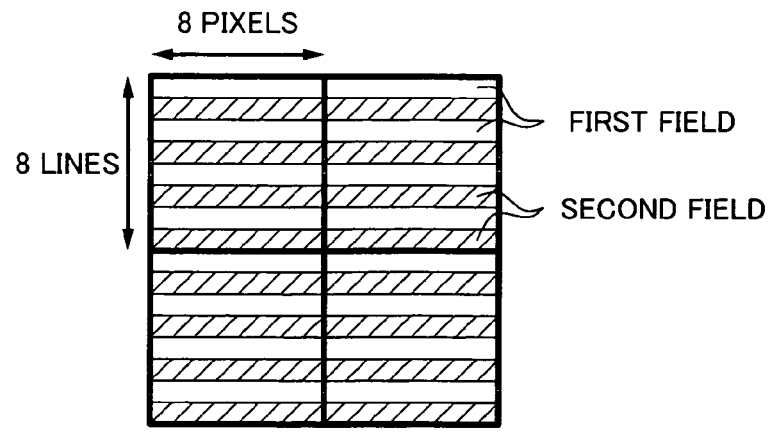
FIG. 17A, FIG. 17B, and FIG. 17C are schematic diagrams showing an example of a macro block subdividing process of the sub block segmenting portion after the DCT mode has been determined.

At that point, the DCT mode type data dct_typ inserted into the supplied stream is referenced. When it has been determined that the DCT mode type dct_typ represents the frame encoding mode, the macro block shown in FIG. 17A is subdivided into sub blocks each of which is composed of four pixels×four lines and that alternately contain lines of the first and second fields. When it has been determined that the DCT mode type data dct_typ represents the field encoding mode, as shown in FIG. 17C, the macro block is subdivided into sub blocks of the first field and sub blocks of the second field, each sub block being composed of four pixels×four lines.

Figure 17B:
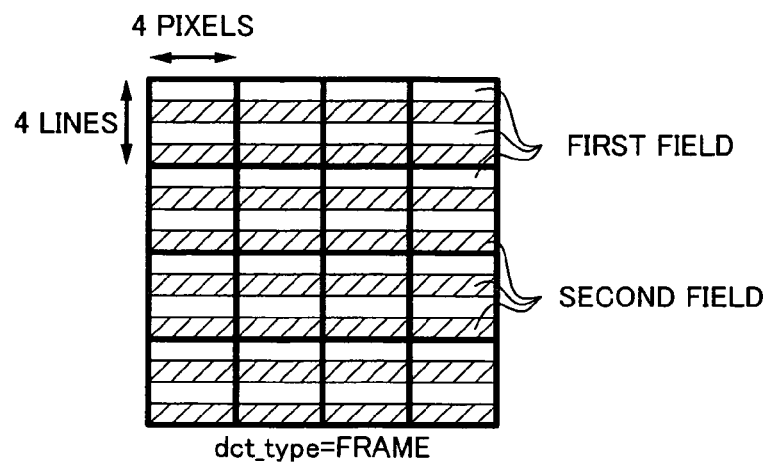
Figure 17C:
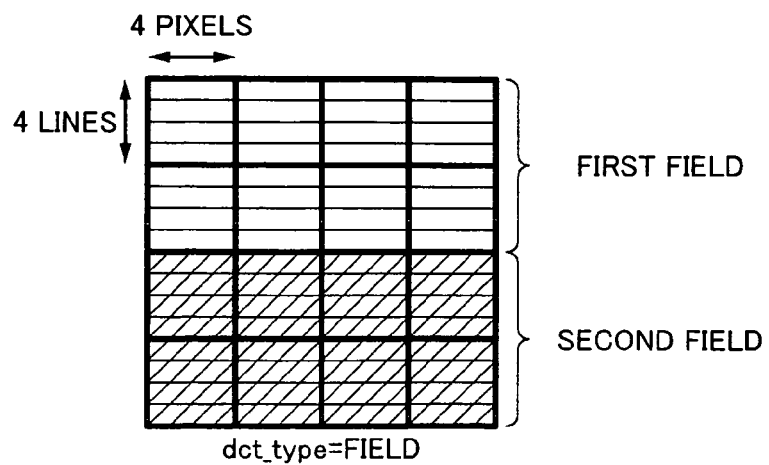

In FIG. 17A, FIG. 17B, and FIG. 17C, hatched lines represent the second field, whereas non-hatched lines represent the first field.

The macro block, which has been subdivided into sub blocks, is supplied to an activity portion 232. The activity portion 232 obtains the average value P of the luminance levels Yk of each sub block of four pixels×four lines using Formula (11).

$$P = \frac{1}{16} \Sigma[k=1, 16] Yk \tag{11}$$

Next, the absolute values of the difference values between the luminance levels Yk of each sub block and the average value P are obtained. In addition, the average difference value var_sblk of the absolute values of the difference values of each sub block is obtained.

$$var\_sblk = \frac{1}{16} \Sigma[k=1, 16] abs(Yk-P) \tag{12}$$

Since one macro block is composed of 16 sub blocks, the minimum value of 16 average difference values var_sblk of each sub block is selected (Formula (13)). The selected average difference value var_sblk is referred to as activity act of the first and second fields of the macro block.

$$act = \min [blk=1, 16](var\_sblk) \tag{13}$$

Figure 9C:
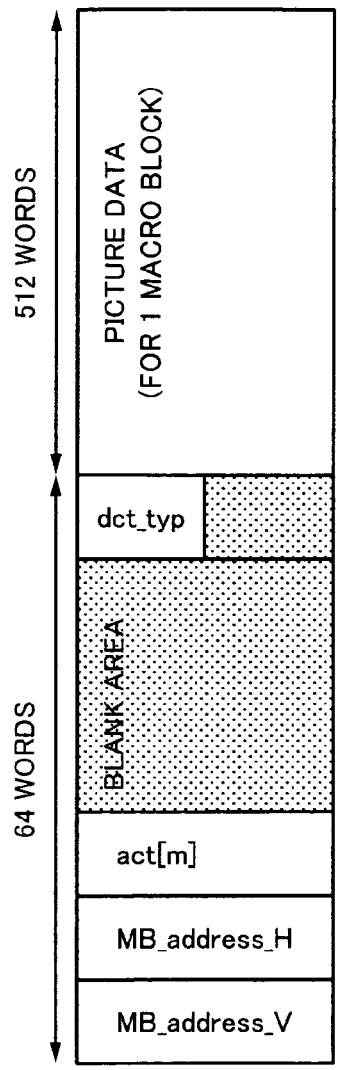

As shown in FIG. 9C, the activity act of the macro block is placed in the header portion of the stream. The activity act is supplied to the normalizing portion 233 along with data of the macro block. With the activity act of the macro block and the average value avg_act of the field activities obtained from the averaging portion 206, the normalizing portion 233 obtains a normalized activity Nact.

The normalized activity Nact can be obtained using Formula (14) with for example the activity act of the macro block and the average value avg_act of the field activities so that the normalized activity Nact is in the range from "2.0" to "0.5".

$$Nact = (2 \times act + avg\_act)/(act + 2 \times avg\_act) \tag{14}$$

Figures 10A, 10B, 10C:
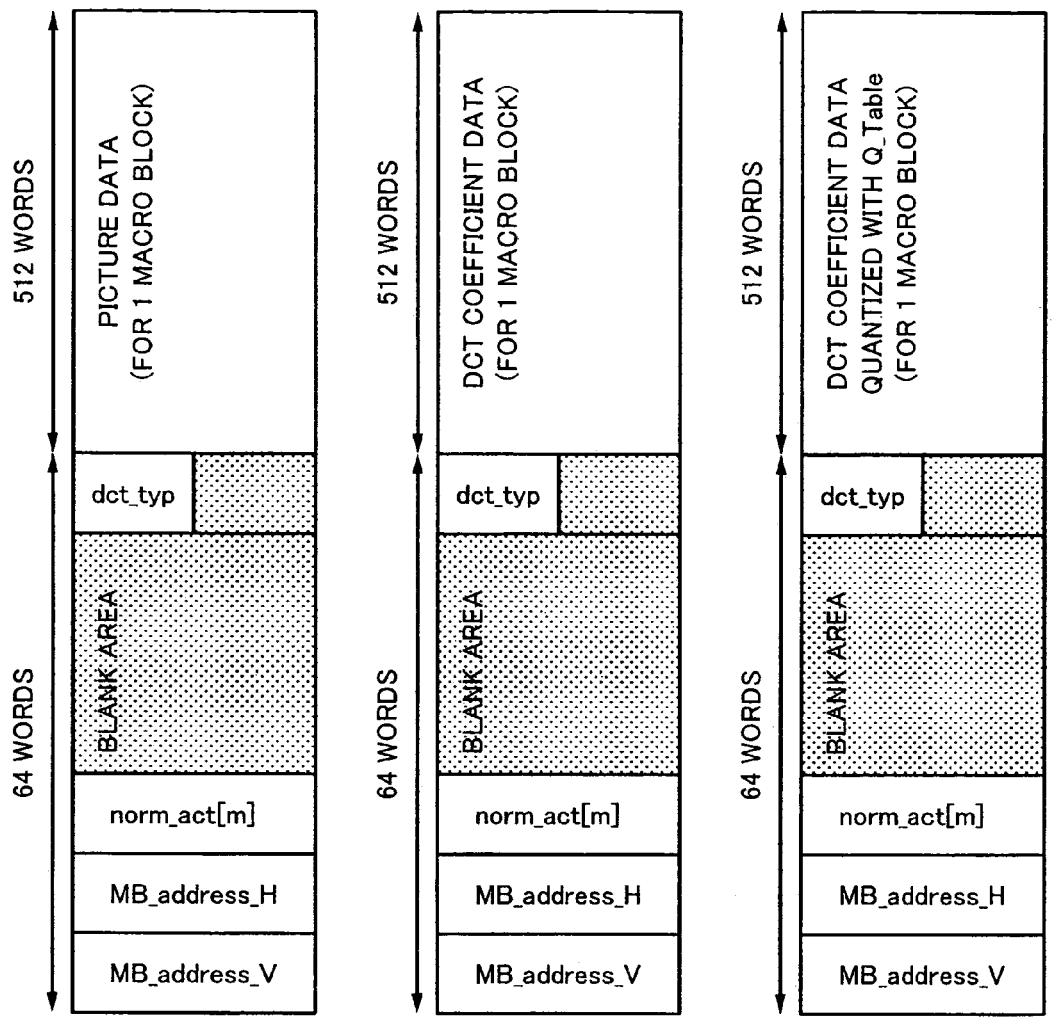
FIG. 10A, FIG. 10B, and FIG. 10C are schematic diagrams showing examples of the structures of streams transferred in each portion of the MPEG encoder.

As shown in FIG. 10A, the normalized activity Nact is temporarily inserted as normalized activity data norm_act that is a flag into the header portion of the stream and sent to each portion downstream. The aforementioned activity act is overwritten to the normalized activity data norm_act in the stream.

An output of the normalizing portion 233 is supplied to a DCT portion 210A. The DCT portion 210A divides the supplied macro block into DCT blocks each of which is composed of eight pixels×eight lines, performs the two-dimensional DCT for each DCT block, and generates DCT coefficients. As shown in FIG. 10B, the DCT coefficients are placed in the data portion of the stream and supplied to a quantizer table portion 211A.

The quantizer table portion 211A quantizes the DCT coefficients, which have been transformed by the DCT portion 210A, with a quantizer matrix (quantizer_matrix). As shown in FIG. 10C, the DCT coefficients, which have been quantized by the quantizer table portion 211A, are placed in the data portion of the stream and then output. An output of the quantizer table portion 211A is supplied to a multi-staged quantizer portion composed of a plurality of Q_n (quantizer) portions 212, 212, . . . , VLC portions 213, 213, . . . , cumulating portions Σ 214, 214, and cumulating portions Σ 215, 215, . . . . The DCT coefficients quantized by the quantizer table portion 211A are quantized on multiple stages of the quantizer portions.

The Q_n portions 212, 212, . . . quantize the DCT coefficients with different quantizer scales (quantizer_scale) Q. The values of the quantizer scales Q are prescribed in for example the MPEG2 standard. The Q_n portions 212, 212, . . . are composed of for example 31 quantizers according to the standard. At that point, since n=31, the Q_n portions 212, 212, . . . are a Q_1 portion, a Q_2 portion, . . . , and a Q_31 portion. With the quantizer scales Qn, the Q_n portions 212 quantize DCT coefficients with the quantizer scales Qn assigned thereto at a total of 31 steps. Hereinafter, the quantizer scale values of the Q_n portions 212, 212, . . . are denoted by the quantizer scales Qn values.

The Q_n portions 212, 212, . . . quantize DCT coefficients with their quantizer scale Qn values. At that point, with the quantizer scale mqaunt, which is in consideration of the visual characteristic, and which has been obtained using Formula (6) with the normalized activity data norm_act obtained by the normalizing portion 233, the adaptive quantization is performed.

$$mqaunt = Q\_n \times norm\_act \tag{6}$$

Figure 11A:
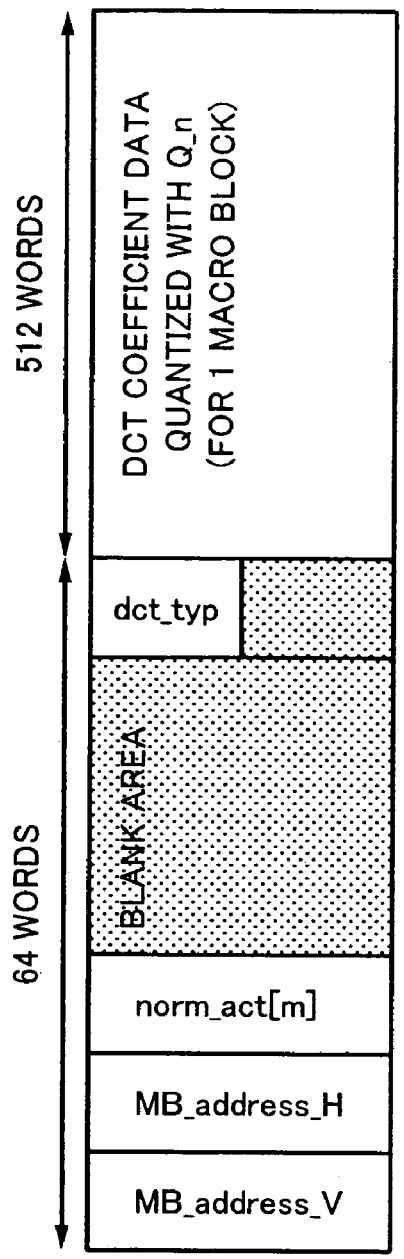
FIG. 11A and FIG. 11B are schematic diagrams showing examples of the structures of streams transferred in each portion of the MPEG encoder.

The DCT coefficients adaptively quantized by the Q_n portions 212, 212, . . . with the quantizer scales Qn are placed in the data portion of the stream as shown in FIG. 11A and supplied to the VLC portions 213, 213, . . . . The VLC portions 213, 213, . . . scan DCT coefficients for the individual quantizer scales Qn according to for example the zigzag scanning method and encodes them with a variable length code with reference to a VLC table according to for example the two-dimensional Huffman code.

Figure 11B:
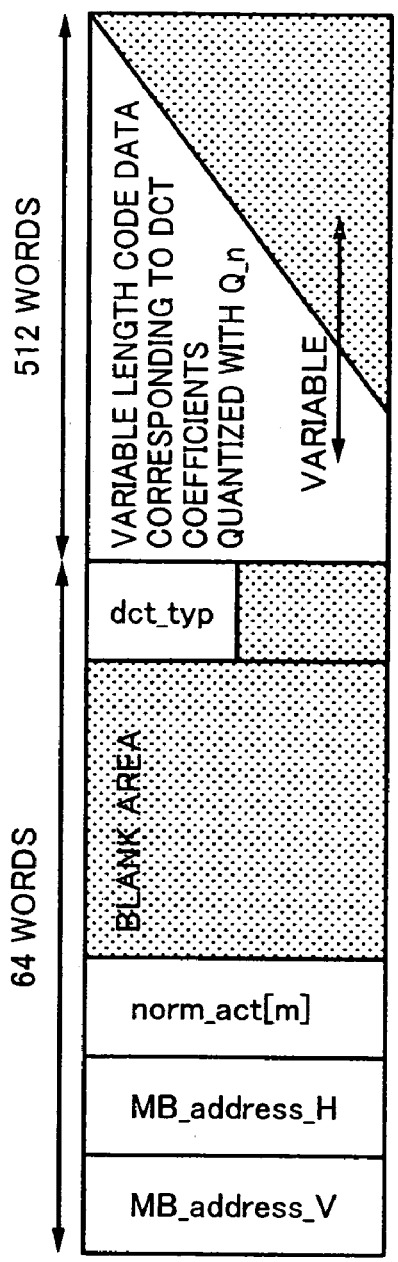

The data, which has been encoded with the variable length code by the VLC portions 213, 213, . . . , is placed in the data portion of the stream as shown in FIG. 11B and then output. Outputs of the VLC portions 213, 213, . . . are supplied to the corresponding cumulating portions Σ 214, 214, . . .

The cumulating portions Σ 214, 214, . . . cumulate the generated code amounts for each macro block. As described above, when 31 types of quantizing devices are used, 31 types of generated code amounts are obtained for each macro block. As shown in FIG. 12A, the generated code amounts cumulated by the cumulating portions Σ 214, 214, . . . are placed in the header portion of the stream. In other words, the generated code amounts quantized by the Q_1 portion 212 to Q_n portion 212 for each macro block are placed in the header portion of the stream. The data portion of the stream is deleted. The stream of each macro block is supplied to the main memory 203.

The generated code amounts for each macro block, which have been output from the cumulating portions Σ 214, 214, . . . , are supplied to the respective cumulating portions Σ 215, 215, . . . . The cumulating portions Σ 215, 215, . . . select generated code amounts for each macro block quantized with quantizer_scale (=mquant), in which the forgoing visual characteristic has been considered, from those obtained by the cumulating portions Σ 214, 214, . . . and cumulate them for one frame.

The generated code amounts (frame data rates) cumulated by the cumulating portions Σ 215, 215, . . . for the quantizer scales Qn are supplied as an n-word stream as shown in FIG.

12B to a rate controlling portion 217. When 31 types of quantizing devices are used as the forgoing example, corresponding 31 types of generated code amounts for each frame are obtained.

Next, a method for obtaining a generated code amount will be described more practically. For example, "generated code amount of Q_4 portion 212" can be obtained as follows.

For example, in the case
norm_act [1]=1.3
norm_act [2]=1.5
norm_act [3]=0.8
norm_act [4]=1.0
. . .
mqaunt [1]=4×1.3=5.2
: The generated code amount of the Q_5 portion 212 is obtained from the header portion of FIG. 12A.
mqaunt [2]=4×1.5=6.0
: The generated code amount of the Q_6 portion 212 is obtained from the header portion of FIG. 12A.
mqaunt [3]=4×0.8=3.2
: The generated code amount of the Q_3 portion 212 is obtained from the header portion of FIG. 12A.
mqaunt [4]=4×1.0=4.0
: The generated code amount of the Q_4 portion 212 is obtained from the header portion of FIG. 12A.
. . .

They are cumulated for one frame. They are performed for each of the Q_1 portion 212 to the Q_n portion 212. As a result, the generated code amount for one frame is obtained.

Next, the encoding process portion 103C will be described. The encoding process portion 103C performs the final encoding process. As described above, the pre-encoding process portion 103B estimates the generated code amounts for one frame in various quantizing operations. The encoding process portion 103C encodes data corresponding to the generated code amount, which has been estimated for one frame so that the generated code amount does not exceed the pre-designated target generated code amount and outputs an MPEG ES.

The data used in the encoding process portion 103C has been stored in the main memory 203. However, as described above, when the generated code amounts for one frame have been estimated in various quantizing operations by the pre-encoding process portion 103B, the encoding process portion 103C can start the process. As described above, the process of each portion of the encoding process portion 103C can be properly started corresponding to a command issued from the timing generator TG 220.

Figure 13A:
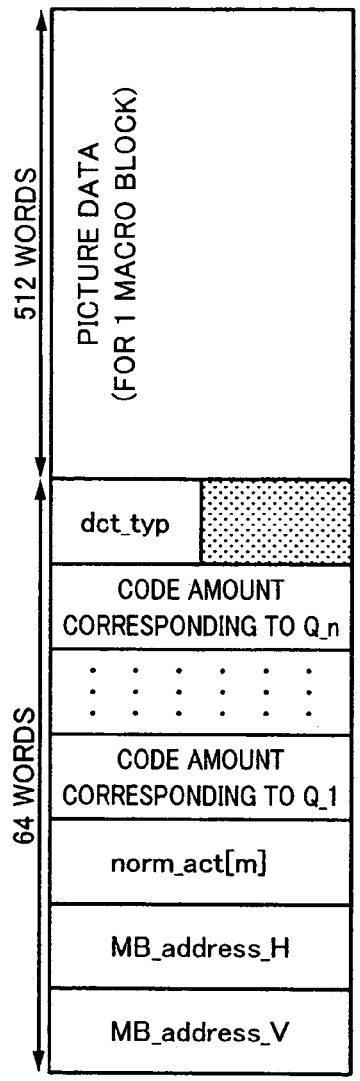
FIG. 13A, FIG. 13B, and FIG. 13C are schematic diagrams showing examples of the structures of streams transferred in each portion of the MPEG encoder.

Video data that has been read from the main memory 203 is supplied to a raster scan/block scan converting portion 207B. The raster scan/block scan converting portion 207B performs a process similar to the process of the raster scan/block scan converting portion 207A and extracts a macro block of 16 pixels×16 lines from the video data. As shown in FIG. 13A, the extracted macro block is placed in a data portion corresponding to the header portion shown in FIG. 12A and supplied to a DCT mode portion 216.

Figure 13B:
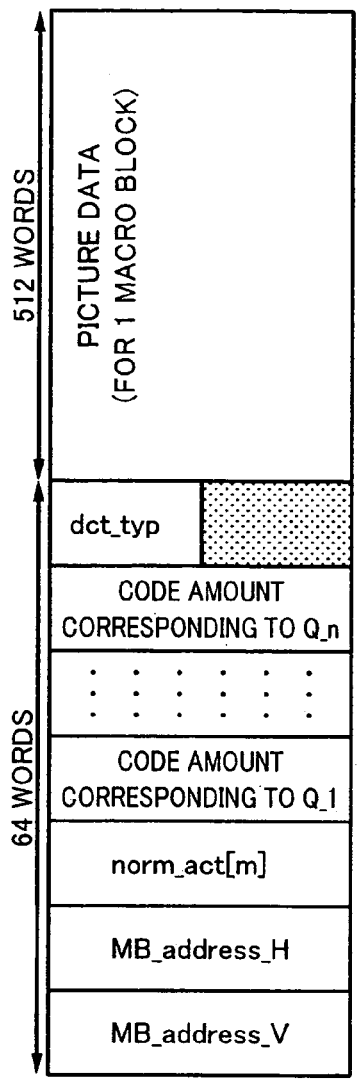

Like the DCT mode portion 208, the DCT mode portion 216 decides to use the field DCT encoding mode or the frame DCT encoding mode to encode data. At that point, the DCT mode portion 208 has decided the DCT mode portion 208 and temporarily placed the result as DCT type data dct_typ in the stream (see FIG. 13A). The DCT mode portion 216 detects the DCT type data dct_typ from the stream and switches to the field encoding mode or the frame encoding mode corresponding to the detected DCT type data dct_typ. An output of the DCT mode portion 216 is shown in FIG. 13B.

Figure 13C:
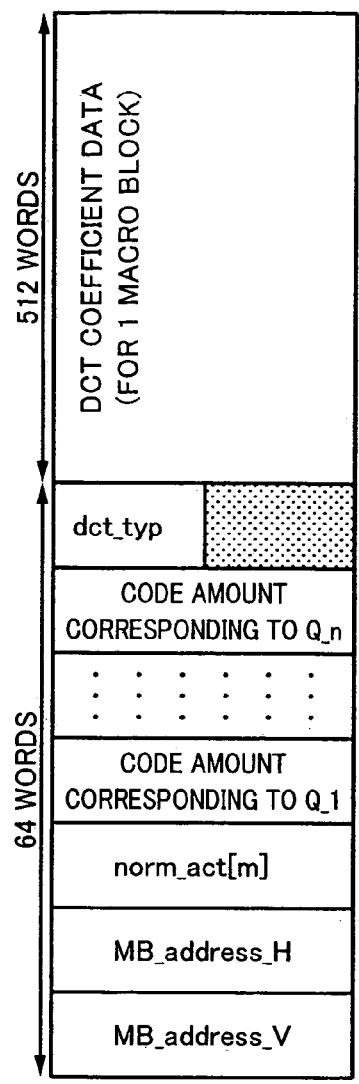

A macro block that has been output from the DCT mode portion 216 is supplied to a DCT portion 210B. Like the DCT portion 210A, the DCT portion 210B two-dimensionally transforms the macro block into DCT coefficients in the unit of one DCT block of eight pixels×eight lines. As shown in FIG. 13c, the DCT coefficients, into which the macro block has been two-dimensionally transformed corresponding to the two-dimensional DCT method, are placed in the data portion of the stream and then output from the DCT portion 210B.

Figure 14A:
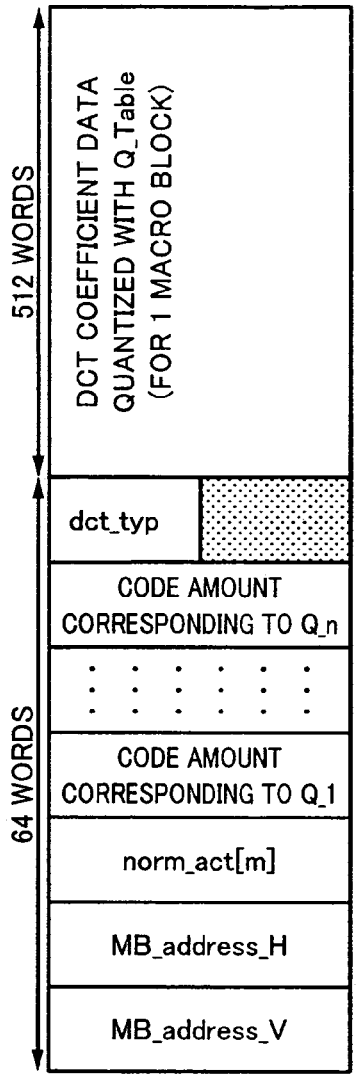
FIG. 14A, FIG. 14B, and FIG. 14C are schematic diagrams showing examples of the structures of streams transferred in each portion of the MPEG encoder.

A quantizer table portion 211B can be structured in the same manner as the forgoing quantizer table portion 211A. The quantizer table portion 211B quantizes the DCT coefficients transformed by the DCT portion 210B with a quantizer matrix. As shown in FIG. 14A, the DCT coefficients quantized by the quantizer table portion 211B are placed in the data portion of the stream and supplied to a rate controlling portion 217.

The rate controlling portion 217 selects one from the frame data rates, which have been obtained by the cumulating portions Σ 215, 215, . . . of the pre-encoding process portion 103B for each quantizer scale Qn so that the selected one does not exceed the maximum generated code amount per frame designated by the system controller 117 and is the closest to the designated value. The quantizer scale (mquant) for each macro block used in the quantizing device corresponding to the selected frame data rate is obtained from the normalized activity data norm_act placed in the stream and supplied to a quantizing portion 218.

Figure 14B:
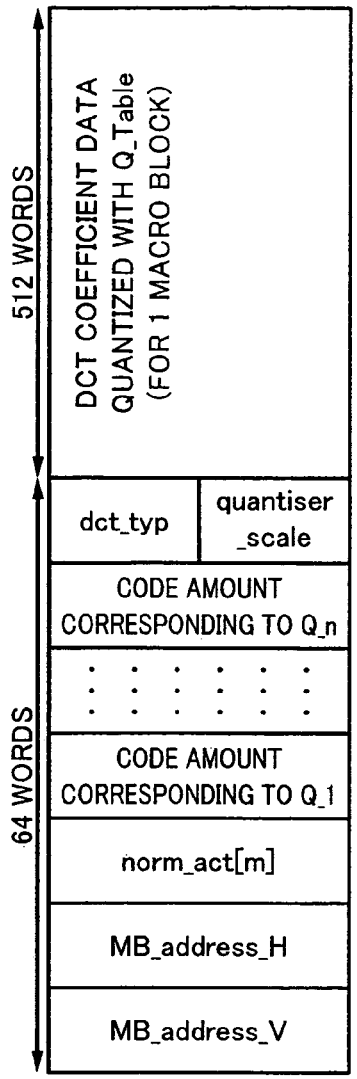

The quantizer scale for each macro block is placed as quantizer_scale on the rear end side of the header portion of the stream as shown in FIG. 14B and then sent to the quantizing portion 218.

The maximum generated code amount per frame is designated by for example the system controller 117 and supplied to the rate controlling portion 217 through the CPU I/F block 221.

At that point, the value of the quantizer scale (mquant) for each macro block can be decreased by one size in the range that does not exceed the difference between the maximum generated code amount per frame, which has been designated by the system controller 117 and transferred through the CPU I/F block 221, and the generated code amount corresponding to the quantizer scale (mquant) for each macro block, which has been obtained from the normalized activity data norm_act placed in the stream. Thus, since a code amount close to the maximum generated code amount designated by the system controller 117 and transferred trough the CPU I/F block 221 is obtained, high picture quality can be accomplished.

The quantizing portion 218 extracts the quantizer scale (quantizer_scale) designated by the rate controlling portion 217 in the forgoing manner from the stream and quantizes DCT coefficients with the quantizer table portion 211B corresponding to the extracted quantizer scale. At that point, since the quantizer scale supplied from the rate controlling portion 217 is the value of the quantizer scale (mquant) obtained from the normalized activity data norm_act, adaptive quantization is performed in consideration of visual characteristic.

Figure 14C:
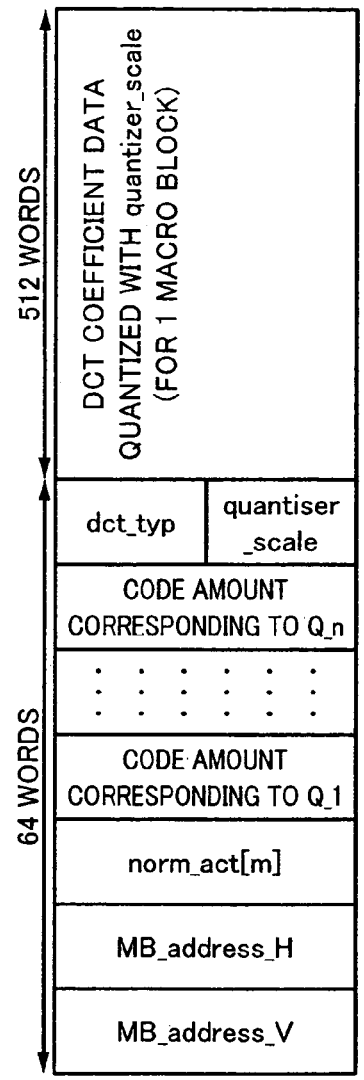

The DCT coefficients quantized by the quantizing portion 218 are placed in the data portion of the stream as shown in FIG. 14C and supplied to a VLC portion 219. The DCT coefficients supplied to the VLC portion 219 are scanned corresponding to for example the zigzag scanning method. The resultant DCT coefficients are encoded with a variable length code with reference to a VLC table according to the two-dimensional Huffman code. The variable length code is bit-shifted so that it is byte-aligned and then output as an MPEG ES.

Figure 15:
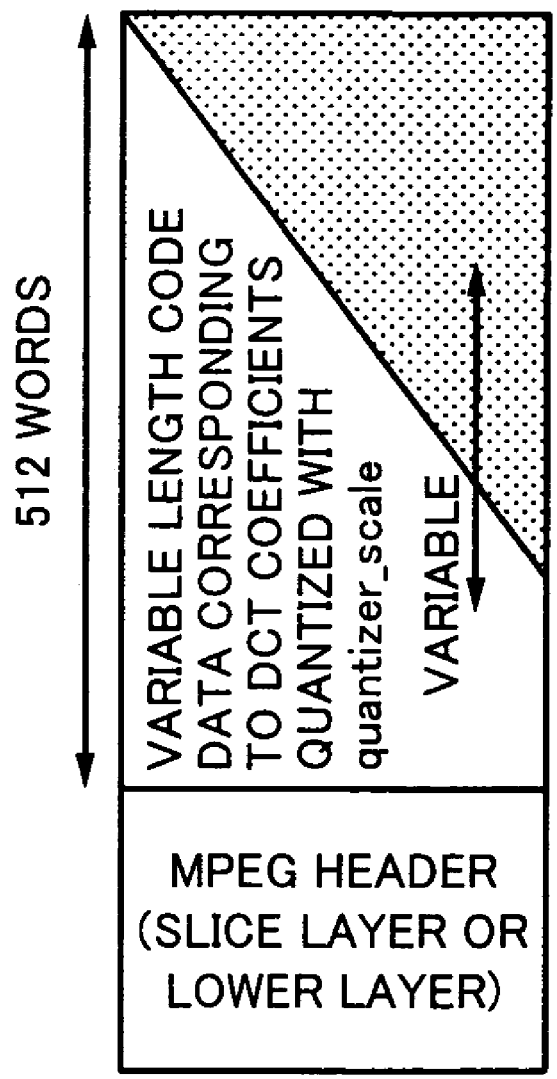
FIG. 15 is a schematic diagram showing an example of the structure of a stream transferred in each portion of the MPEG encoder.

At that point, as shown in FIG. 15, the header portion as the first half portion of the stream is replaced with the MPEG header portion in which the MPEG header information of the slice layer or below is placed. The variable length code is placed in the data portion on the second half side of the stream.

FIG. 18 shows the structure of an example of the above-described sub block forming portion 231 and the activity portion 232. When the structure is partly changed, it can be easily applied to the sub block forming portion 230 and the activity portion 205.

A luminance level value Yk of one pixel of a sub block of four pixels×four lines is input to a delay circuit 31 and one input terminal of an adding device 33. Data that is output from a selector 32 is input to the other input terminal of the adding device 33. The adding device 33 adds the luminance level value Yk and the data that has been output from the selector 32. An output value of the adding device 33 is temporarily stored in a register 34 and then sent to the selector 32. The adding device 33, the selector 32, and the register 34 that are as a loop obtain the sum of 16 luminance level values Yk of one sub block of four pixels×four lines.

After the sum of the one sub block has been calculated, the selector 32 outputs an initial value, 0. With the initial value, the adding device 33 and the register 34 are initialized.

An output of the register 34 is supplied to a shift circuit 35. The shift circuit 35 shifts the output of the register 34 by four bits so as to perform a calculation of $1/16$. As a result, the average value P of the luminance level values of the sub block is obtained. The average value P is input to a subtrahend input terminal of a subtracting device 36. A luminance level value Yk delayed for a time period corresponding to the summing calculation of the sub block by the delay circuit 31 is input to a minuend input terminal of the subtracting device 36.

The subtracting device 36 subtracts the average value P, which has been supplied from the shift circuit 35, from the luminance level value Yk, which has been output from the delay circuit 31. An output of the subtracting device 36 is supplied to an absolute value calculating circuit 37. The absolute value calculating circuit 37 obtains the absolute value of the output of the subtracting device 36. The absolute value is referred to as absolute value of difference value, {abs (Yk−P)}. The absolute value of difference value, {abs (Yk−P)}, is input to one input terminal of an adding device 40 through a register 38.

Data that is output from a selector 39 is input to the other input terminal of the adding device 40. The adding device 40 adds the absolute value of difference value, {abs (Yk−P)}, and the data that has been output from the selector 39. An output of the adding device 40 is temporarily stored in a register 41. The output of the adding device 40 is input to the selector 39 and a shift circuit 42. The adding device 40, the selector 39, and the register 41 as a loop obtain the sum of 16 absolute values of difference values, {abs (Yk−P)}, of the sub block of four pixels×four lines.

After the sum for one sub block has been calculated, the selector 39 outputs an initial value, 0. With the initial value, the adding device 40 and the register 41 are initialized.

The sum of the absolute values of difference values, {abs (Yk−P)}, for one sub block, which have been output from the register 41, is supplied to the shift circuit 42. The shift circuit 42 shifts the sum by four bits so as to perform a calculation of $1/16$. As a result, an average difference value var_sblk of the sub block is obtained. The average difference value var_sblk is supplied to a minimum value calculating circuit 43. The minimum value calculating circuit 43 selects the minimum average difference value var_sblk of the macro block to which a sub block that represents the supplied average difference value var_sblk belongs. The selected average difference value var_sblk is output as an activity act of the macro block.

The forgoing example shows that the process of the MPEG encoder 103 is implemented by hardware. However, according to the present invention, the process of the MPEG encoder 103 is not limited to such an example. In other words, the process of the MPEG encoder 103 can be implemented by software. In this case, for example, a computer apparatus is provided with analog and digital interfaces for a video signal. Software installed on the computer is executed with a CPU and a memory. In the forgoing digital VTR structure, the CPU and memory may be substituted for the MPEG encoder 103.

The software is recorded as program data on a recording medium such as a CD-ROM (Compact Disc-Read Only Memory). The recording medium, on which the software has been recorded, is loaded to the computer apparatus. With a predetermined operation, the software is installed onto the computer apparatus. As a result, the process of the software can be executed. Since the structure of the computer apparatus is well known, its description will be omitted in the following.

Figure 19:
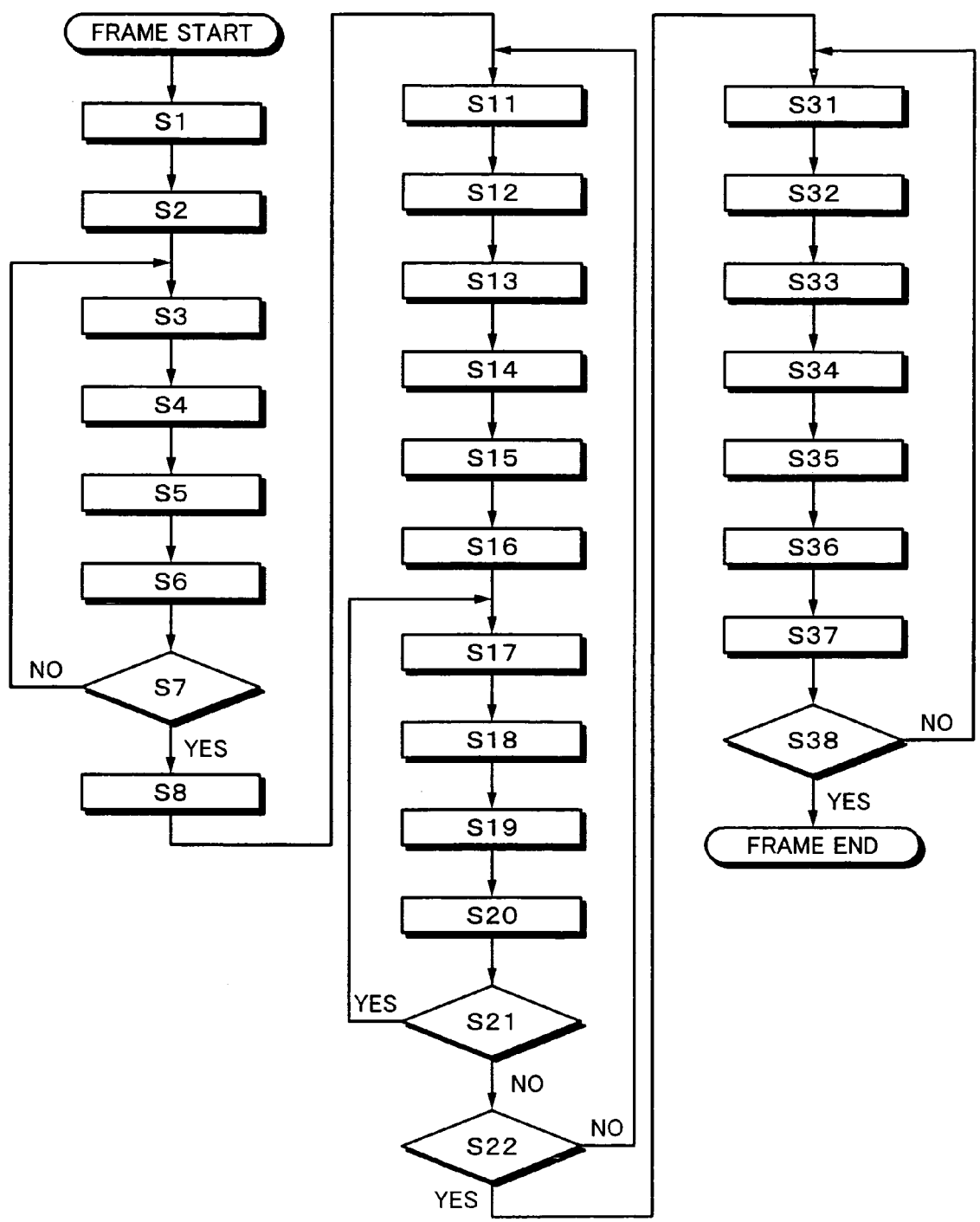
FIG. 19 is a flow chart showing an example of the process of the MPEG encoder is implemented by software.

FIG. 19 is a flow chart showing an example of the process of the MPEG encoder 103 implemented by software. Since the process of the flow chart is the same as the process implemented by the forgoing hardware, the process of the flow chart will be briefly described in consideration of the process implemented by hardware. Steps S1 to S8 correspond to the process of the forgoing input field activity averaging process portion 103A. Steps S11 to S22 correspond to the process of the forgoing pre-encoding process portion 103B. Steps S31 to S38 correspond to the process of the forgoing encoding process portion 103C.

At step S1, the first step, video data is captured. At step S2, the next step, each header of an MPEG EG is extracted in the vertical blanking region and stored in a memory. In other than the vertical blanking region, the captured video data is stored in the memory.

At step S3, video data of the first field is converted from raster scan data into block scan data. As a result, a macro block is extracted. This operation is performed by controlling read addresses of the video data stored in the memory. At step S4, the extracted macro block is subdivided into sub blocks each of which is composed of four pixels×two lines.

At step S5, with the sub blocks into which the video data has been subdivided, the activity act of the first field is calculated. In other words, as described above, the average value P of luminance level values Yk of each sub block of four pixels× two lines is obtained. In addition, the absolute values of the difference values between the luminance level values Yk and the average value P are obtained. With the absolute values of the difference values, the average difference value var_sblk of the luminance level values Yk of the sub block is obtained. The minimum average difference value var_sblk of one macro block is selected as the activity act of the macro block.

The activity Activity (act) obtained at step S5 is cumulated at step S6 and stored as the cumulated value sum to the memory. The process of steps S3 to S6 is repeated until it has been determined that the last macro block of the first field has been processed. In other words, the cumulated value sum is the sum of activities of macro blocks for one field.

When it has been determined that the last macro block of one field has been processed at step S7, the cumulated value stored in the memory is divided by the number of macro blocks for one field at step S8. As a result, the average value Activity (avr_act) of the field activities for the field is obtained and stored in the memory.

When the average value Activity (avg_act) of the field activities has been obtained, the flow advances to step S11. Like at step S3, at step S11, the video data stored in the memory is converted from raster scan data into block scan data. As a result, a macro block is extracted.

At step S12, the field DCT encoding mode or the frame DCT encoding mode is selected. The selected result is stored as DCT mode type data dct_typ in the memory. At step S13, corresponding to the selected result at step S12, the macro block is subdivided into sub blocks each of which is composed of four pixels×four lines.

At step S14, with the sub blocks into which the video data has been subdivided, the activity act of the macro block of the first and second fields is obtained. In other words, as described above, the average value P of the luminance values Yk of each sub block of four pixels×four lines is obtained. In addition, the absolute values of the difference values between the luminance level values Yk and the average value P are obtained. With the absolute values of the difference values, the average difference value var_sblk of the luminance level values Yk of the sub block is obtained. The minimum average difference value var_sblk of the macro block is selected as the activity act of the macro block. With the activity act and the average value Activity (avg_act) of the field activities obtained at step S8 and stored in the memory, the normalized activity Activity (norm_act) is obtained. The obtained normalized activity Activity (norm_act) is stored in the memory.

At step S15, the macro block extracted from the video data at step S11 is divided into DCT blocks each of which is composed of eight pixels×eight pixels. The DCT blocks are two-dimensionally transformed corresponding to the two-dimensional DCT method. As a result, DCT coefficients are obtained. At step S16, the DCT coefficients are quantized with a quantizer table (quantizer_table). Thereafter, the flow advances to step S17.

The process of steps S17 to S21 is repeated with each quantizer scale (quantizer_scale) Qn. As a result, the processes corresponding to the forgoing Q_n portions 212, 212, . . . , the forgoing VLC portions 213, 213, . . . , the forgoing cumulating portions Σ 214, 214, . . . , and the forgoing cumulating portions Σ 215, 215, . . . . In other words, at step S17, the DCT coefficients are quantized with quantizer scale Q=1. At step S18, the DCT coefficients quantized with reference to the VLC table are encoded with a variable length code. At step S19, the generated code amount of the macro block with the variable length code is calculated. At step S20, the generated code amount of each macro block for one frame is cumulated. At step S21, it is determined whether or not there is another quantizer scale Qn. When it has been determined that there is another quantizer scale Qn, the flow returns to step S17. At step S17, the process for the other quantizer scale Qn is performed. The generated code amounts for one frame corresponding to the individual quantizer scales Qn are stored in the memory.

When it has been determined that the cumulated value of the generated code amounts for the frame corresponding to all the quantizer scale values Qn has been obtained, the flow advances to step S22. At step S22, it is determined whether or not the last macro block (MB) of one frame has been processed. When the last macro block has not been processed, the flow returns to step S11. When the last macro block has been processed and the generated code amount for one frame has been estimated, the flow advances to step S31. At step S31, the real encoding process is performed.

Like at S11, at step S31, the video data stored in the memory is converted from raster scan data into block scan data. As a result, a macro block is extracted. At step S32, corresponding to the DCT mode type data dct_typ stored in the memory at step S12, the DCT encoding mode is designated.

At step S33, the macro block extracted from the video data at step S31 is divided into DCT blocks each of which is composed of eight pixels×eight lines. The DCT blocks are two-dimensionally transformed according to the two-dimensional DCT method. As a result, DCT coefficients are obtained. The DCT coefficients are quantized with the quantizer table (quantizer_table) at step S34. Thereafter, the flow advances to step S35.

At step S35, corresponding to the generated code amounts for one frame corresponding to the quantizer scales Qn, which have been estimated at steps S11 to S22, the quantizer scales Qn used at step S36 are designated for each macro block so as to control the generated code amount in the real encoding process.

Thereafter, the flow advances to step S36. With the quantizer scales Qn designated at step S35, the DCT coefficients quantized with the quantizer table at step S34 are quantized. With reference to the VLC table, the DCT coefficients quantized at step S36 are encoded with a variable length code at step S37. At step S38, it is determined whether or not the last macro block of one frame has been processed. When it has been determined that the last macro block of one frame has not been processed, the flow returns to step S31. At step S31, the quantizing process and the variable length code encoding process are performed for the next macro block. In contrast, when it has been determined that the last macro block of one frame has been processed at step S38, the encoding process for one frame has been completed.

The forgoing example shows that the pre-encoding process of steps S11 to S22 is different from the encoding process of steps S31 to S38. However, it should be noted that the present invention is not limited to such an example. For example, the generated code amounts estimated at steps S11 to S22 are stored in the memory. Data that is obtained by the real encoding process is selected from the stored data. As a result, the process of steps S31 to S38 can be contained as a loop in the process of steps S11 to S22.

In the forgoing example, a macro block of 16 pixels×16 lines is subdivided into sub blocks each of which is composed of four pixels×four lines. However, the present invention is not limited to such an example. A macro block may be subdivided into sub blocks each of which is smaller than a sub block of eight pixels×eight lines. With the smaller sub blocks, activities may be obtained. For example, an activity may be obtained in the unit of a sub block of $(X/2^m)$ pixels×$(Y/2^m)$ lines which is smaller than a DCT block of X pixels×Y lines.

In the forgoing example, as the picture data encoding system, the MPEG2 system as an encoding system of which a picture is divided into blocks and each block is DCT-transformed is used. However, the present invention is not limited to such an example. As long as picture is encoded in the unit of one block, another encoding system can be used.

In the forgoing example of the present invention, a digital VTR has been described. However, the present invention is not limited to such an example. The present invention can be applied to a picture processing apparatus that compression-encodes picture data according to a block encoding method, for example a picture transmitting apparatus that compression-encodes picture data and transmits the encoded picture data.

As described above, according to the present invention, since the size of a sub block with which an activity of a macro block is obtained is four pixels×four pixels, which are smaller than the size of a conventional block of eight pixels×eight lines, the difference average value of each sub block is more emphasized than that of each block of eight pixels×eight lines. Thus, when the minimum value of difference average values of sub blocks each of which is composed of four pixels×four lines is selected as an activity of a macro block, the activity of the macro block that contains even a small plain region can be more suppressed.

This means that a quantizer value of a macro block that contains an edge of a picture such as a character or a contour portion of a picture. As a result, mosquito noise of a macro block that contains an edge portion of a picture can be suppressed.

When mosquito noise takes place at a plain portion of a picture, it tends to be more remarkable. Thus, especially when the code amount is sufficient and the compression rate is low, it is very effective to suppress a quantizer value of a macro block that contains even a small plain portion.

The invention claimed is:

1. A picture processing apparatus comprising:

transforming means for performing a transforming process for picture data in the unit of a transforming block and outputting transformed coefficients as a result of the transforming process;

sub block forming means for forming a sub block from the transforming block;

activity detecting means for calculating an activity in the unit of a plurality of sub blocks contained in the transforming block of the picture data and outputting an activity of a block composed of the plurality of transforming blocks with the activity of each of the sub blocks; and quantizing means for deciding a quantizer scale of the block according to the activity output from the activity detecting means and quantizing the transformed coefficients output from the transforming means with the quantizer scale, wherein the activity detecting means comprises:

means for obtaining an average value of levels of pixels for each sub block;

means for obtaining an absolute value of a difference value between the level of the pixel and the average value for each pixel;

means for obtaining an average difference value of the absolute values of the difference values for each sub block; and means for selecting a minimum value from the average difference values of the block and using the selected minimum value as the activity of the block.

2. A picture processing comprising:

a transforming device configured to perform a transforming process for picture data in the unit of a transforming block and outputting transformed coefficients as a result of the transforming process;

a sub block forming device configured to form a sub block from the transforming block;

an activity detecting device configured to calculate an activity in the unit of a plurality of sub blocks contained in the transforming block of the picture data and outputting an activity of a block composed of the plurality of transforming blocks with the activity of each of the sub block; and a quantizing device configured to decide a quantizer scale of the block according to the activity output from the activity detecting device and quantizing the transformed coefficients output from the transforming device with the quantizer scale, wherein the activity detecting device comprises:

an averaging device configured to obtain an average value of levels of pixels for each sub block;

an absolute value device configured to obtain an absolute value of a difference value between the level of the pixel and the average value for each pixel;

a calculating device configured to obtain an average difference value of the absolute values of the difference values for each sub block; and a selecting device configured to select a minimum value from the average difference values of the block and using the selected minimum value as the activity of the block.

* * * * *